United States Patent [19]
Hammond, Jr.

[11] Patent Number: 6,097,856
[45] Date of Patent: Aug. 1, 2000

[54] APPARATUS AND METHOD FOR REDUCING IMAGING ERRORS IN IMAGING SYSTEMS HAVING AN EXTENDED DEPTH OF FIELD

[75] Inventor: Charles Mitchell Hammond, Jr., Skaneateles, N.Y.

[73] Assignee: Welch Allyn, Inc., Skaneateles Falls, N.Y.

[21] Appl. No.: 09/113,523

[22] Filed: Jul. 10, 1998

[51] Int. Cl.$^7$ ..................................................... G06K 9/20
[52] U.S. Cl. ............................................................. 382/312
[58] Field of Search ................................... 382/100, 210, 382/212, 280, 255, 312, 321, 322, 323, 324; 356/394, 398; 359/11, 29, 559, 558, 563, 564; 250/201.2, 201.4

[56] References Cited

U.S. PATENT DOCUMENTS

| | | | |
|---|---|---|---|
| 3,614,310 | 10/1971 | Korpel . | |
| 3,928,842 | 12/1975 | Green et al. | 382/124 |
| 4,082,431 | 4/1978 | Ward, III . | |
| 4,275,454 | 6/1981 | Klooster, Jr. . | |
| 5,003,166 | 3/1991 | Girod | 250/201.4 |
| 5,142,413 | 8/1992 | Kelly | 359/559 |
| 5,216,529 | 6/1993 | Paek et al. | 359/29 |
| 5,289,299 | 2/1994 | Paek et al. | 359/29 |
| 5,307,175 | 4/1994 | Seachman et al. | 358/401 |
| 5,386,105 | 1/1995 | Quinn et al. | 359/558 |
| 5,426,521 | 6/1995 | Chen et al. | 359/9 |
| 5,438,440 | 8/1995 | Paek et al. | 359/11 |
| 5,521,695 | 5/1996 | Cathey, Jr. et al. | 250/201.2 |
| 5,646,391 | 7/1997 | Forbes et al. | 235/462 |
| 5,748,371 | 5/1998 | Cathey, Jr. et al. | 359/558 |

OTHER PUBLICATIONS

Goodman, Joseph W *"Introduction to Fourier Optics"*, pp. 138–139, 1996.
Driscoll et al., *Handbook of Optics*, pp 2–19 to 2–20, 1978.
Mino et al., "Improvement in the OTF of a defocused Optical System Through the use of Shaded Apertures" *Applied Optics*, pp.2219–2224, Oct. 1971.
Ojeda–Castaneda et al. "High focal depth by apodization and digital restoration", *Applied Optics*, v. 27 No. 12, pp. 2583–2586, Jun. 15, 1988.
Ojeda–Castaneda et al., "Zone Plate for Arbitrarily High focal depth", Applied Optics, v. 29 No. 7, pp.994–997.
McCrickerd, J.T. "Coherent Processing and Depth of Focus of Annular Aperture Image", *Applied Optics*, pp. 2226–2230, Oct. 1971.
Dowski et al., "Extended depth of field through wave–front coding", *Applied Optics*, vol. 34 No. 11, pp. 1859–1866, Apr. 10, 1995.
First Generation Cubic–PM Optical Mask pp 1–2.
"The World's First Focus–Invariant Imaging System" 1 page.
Bradburn et al., Realizations of Focus Invariance in Optical/Digital Systems with Wavefront Coding pp 1–22.

*Primary Examiner*—Jose L. Couso
*Attorney, Agent, or Firm*—Wall Marijama Bilinski & Burr

[57] ABSTRACT

An improved opto-electronic imaging system which is adapted for use with incoherently illuminated objects, and which produces final images having a reduced imaging error content. The imaging system includes an optical assembly for forming an intermediate image of the object to be imaged, an image sensor for receiving the intermediate image and producing an intermediate image signal, and processing means for processing the intermediate image signal to produce a final image signal having a reduced imaging error content. A reduction in imaging error content is achieved, in part, by including in the optical assembly a phase mask for causing the OTF of the optical assembly to be relatively invariant over a range of working distances, and an amplitude mask having a transmittance that decreases continuously as a function of distance from the center thereof. The reduction in imaging error content is also achieved, in part, by including in the processing means an improved generalized recovery function that varies in accordance with at least the non-ideal calculated IOTF of the optical assembly under a condition of approximately optimum focus.

64 Claims, 16 Drawing Sheets

(1) $\text{PUPIL}(u) := \text{GAUSS}(u,Wg) \cdot \text{CPM}(u,\alpha) \cdot \text{ABERRATIONS}(u)$ (2) $\text{OTF}(u) := \displaystyle\int_{-\left(1-\frac{|u|}{2}\right)}^{\left(1-\frac{|u|}{2}\right)} \text{PUPIL}\left(x+\frac{u}{2}\right) \overline{\text{PUPIL}\left(x-\frac{u}{2}\right)}\, dx$ (3) $\text{FILTER}(u) := \dfrac{\text{ZEROS}(u)}{\text{POLES}(u)}$ (4) $\text{GAUSS}(u,Wg) := \begin{cases} \exp\left[-\left(\dfrac{u}{Wg}\right)^2\right] & \text{if } |u| \leq 1 \\ 0 & \text{otherwise} \end{cases}$ (5) $\text{CPM}(u,\alpha) := \begin{cases} \exp\left[1i \cdot \alpha \cdot (u)^3\right] & \text{if } |u| \leq 1 \\ 0 & \text{otherwise} \end{cases}$ (6) $\text{ABERRATIONS}(u) := \exp(1i \cdot k \cdot \text{OPD}(0,u,0))$ (7) $\text{OPD}(h,\rho,\phi) := \displaystyle\sum_{abc=000}^{ABC} C_{abc} \cdot h^a \cdot \rho^b \cdot \cos(\phi)^c$ (8) $\alpha := k \cdot (n-1) \cdot CO3 \left(\dfrac{L}{2}\right)^3$

WHERE:

$k := \dfrac{2 \cdot \pi}{\lambda}$

- $u$    IS THE NORMALIZED 1D SPATIAL FREQUENCY, i.e. DIVIDED BY THE COHERENT CUTOFF FREQUENCY OF THE OPTICAL SYSTEM
- $Wg$    IS THE GAUSSIAN AMPLITUDE FUNCTION PARAMETER
- $\alpha$    IS THE CUBIC PHASE FUNCTION PARAMETER
- $\lambda$    IS THE ILLUMINATION WAVENUMBER
- $n$    IS THE ILLUMINATION WAVELENGTH
- $CO3$    IS THE REFRACTIVE INDEX OF THE PHASE MASK MATERIAL
- $L$    IS THE CUBIC PHASE COEFFICIENT
-    IS THE WIDTH OF THE SQUARE APERTURE

FIG.10

APPARATUS AND METHOD FOR REDUCING IMAGING ERRORS IN IMAGING SYSTEMS HAVING AN EXTENDED DEPTH OF FIELD

BACKGROUND OF THE INVENTION

This invention relates to an improved apparatus and method for reducing the magnitude of misfocus error in an opto-electronic system used for imaging incoherently illuminated indicia, and is directed more particularly to an apparatus and method in which the magnitude of such errors is reduced by the use of an improved optical assembly in combination with digital post-processing utilizing an improved, generalized recovery function.

DESCRIPTION OF THE PRIOR ART

Obtaining images that are free of errors and distortions introduced by the optical elements that are used in the imaging process has long been a goal of those working with imaging systems. Such systems contemplate the imaging of various kinds of objects, including but not limited to bar code symbols, alphanumeric and non-alphanumeric characters and symbols, and blocks of text. For convenience, all such objects will be referred to herein as target objects or indicia, whether they include encoded data or not. The errors and distortions introduced by the imaging system include, among others, lens aberrations, such as spherical and chromatic aberrations, misfocus errors resulting from an object being located away from the position of best focus, diffraction effects produced by aperture stops, and the diffusion effect associated with some indicia substrates.

One approach to reducing the magnitude of misfocus error is to reduce the numerical aperture of the optical system, (i.e. increase the lens F-number). However decreasing the numerical aperture reduces the optical efficiency of the system inversely as the square of the numerical aperture. In addition, this technique has a fundamental limit beyond which aperture diffraction errors will exceed the misfocus errors.

Another approach to reducing the magnitude of imaging errors is discussed in "Improvement in the OTF of a Defocussed Optical System Through the Use of Shaded Apertures", by M. Mino and Y. Okano, Applied Optics, Vol. 10 No. 10, October 1971. This article discusses decreasing the amplitude transmittance gradually from the center of a pupil towards its rim to produce a slightly better image. "High Focal Depth By Apodization and Digital Restoration" by J. Ojeda-Castaneda et al, Applied Optics, Vol. 27 No. 12, June 1988, discusses the use of an iterative digital restoration algorithm to improve the optical transfer function of a previously apodized optical system. "Zone Plate for Arbitrarily High Focal Depth" by J. Ojeda-Castaneda et al, SPIE Vol. 1319 Optics in Complex systems (1990) discusses use of a zone plate as an apodizer to increase focal depth. While all of these approaches achieve some improvement in image quality, they all have features that limit their usefulness in particular applications, such as bar code reading.

Still another approach to reducing the magnitude of misfocus errors is to include appropriate phase masks in the imaging system. One example of this approach is described in U.S. Pat. No. 5,748,371 (W. T. Cathey and E. R. Dowski). In this patent, the imaging system comprises a lens or lenses and an opto-electronic image sensor. It also includes a cubic phase mask (CPM) which is located at one of the principal planes of the imaging system, and which modifies the optical transfer function (OTF) of the imaging system in a way that causes it to remain approximately constant over some range of distances that extends in both directions (i.e. towards and away from the lens) from the distance of optimum focus. The intermediate image produced by the image sensor is then digitally post-processed to recover a final image which has a reduced misfocus error. While the image correcting technique described above produces results that are substantially better than the results produced by purely optical means, our efforts to use phase masks in imaging type optical readers using this technique have produced unsatisfactory results.

In view of the foregoing, it is asserted that there exists a need for an apparatus and method for further improving the quality of the final images that are recovered from the incoherent intermediate images produced by imaging systems that include phase masks and opto-electronic image sensors.

SUMMARY OF THE INVENTION

In accordance with one aspect of the present invention there is provided an improved optical imaging apparatus which is specifically adapted for tasks such as optical reading of indicia. In accordance with another aspect of the present invention there is provided a method for recovering, from the intermediate images of optical imaging systems that include image sensors, final images that have a substantially reduced overall error content.

Generally speaking, the present invention is based, in part, on the discovery that the use of an amplitude mask in combination with a cubic phase mask and digital post processing improves the overall performance of an imaging system. In addition, the present invention is also based, in part, on the discovery of an optimized, generalized recovery function, which incorporates new insights into the theory of operation of phase and amplitude masks, and which not only reduces the magnitude of misfocus error, but can also simultaneously reduce the magnitude of a number of other errors, such as those resulting from lens aberrations and diffraction effects. This optimization is accomplished by creating, in the spatial frequency domain, a generalized recovery friction which includes the inverse, i.e., in this case the reciprocal, of the calculated (or measured) optical transfer function (OTF) of the optical assembly of the imaging system, under a condition of optimum focus, with a suitable phase mask and amplitude mask in place, and with as many existing known error producing effects as possible, other than misfocus error, being taken into account. When the image spectrum, obtained by applying the DFFT (Discrete Fast Fourier Transform) to the image elements of the intermediate image signal, is multiplied by this recovery function, the misfocus error and the errors associated with the error producing effects that have been taken into account in creating the recovery function are largely compensated for. This leaves a spectrum from which corrected image data elements may be obtained by applying an IDFFT (Inverse DFFT).

In the preferred embodiment of the invention, the recovery function includes not only the above described reciprocal non-ideal OTF component as a component, but also a direct ideal OTF component. The latter component is the calculated ideal OTF of the optical assembly, under a condition of approximately optimum focus with the amplitude mask in place, without the phase mask in place and without any error producing effects being taken into account. In such embodiments the recovery function takes the mathematical form of a fraction. The numerator of this fraction is this calculated ideal OTF and the denominator is the calculated non-ideal or actual OTF of the optical system with the phase mask in place, with the amplitude mask in place, with all error producing effects taken into account and at approximately optimum focus. The numerator of the recovery function may also include an additional term, referred to herein as a filtering, waveshaping or finishing function, which serves to optimize the recovery function for particular applications, such as bar code reading, OCR, text and/or image recovery.

While the recovery function is usually easier to apply in the spatial frequency domain, it may also be applied in the spatial domain. In this case, the method of the invention is practiced by taking the points which make up the digital intermediate image signal and convolving them, on a point-by-point basis, with the IDFFT of the recovery function to produce a final, corrected image. While this embodiment may not be preferred, it is nevertheless within the contemplation of the present invention.

The amplitude mask is substantially free of sharply defined boundaries or edges, and has a transmission coefficient that decreases smoothly as a function of distance from the center thereof. Such an amplitude mask improves the results produced by the recovery function, particularly in bar code reading applications, because it has the effect of further reducing the misfocusing variation of the OTF. This occurs because the amplitude mask in conjunction with the phase mask reduces the impact of the Fresnel diffraction pattern caused by the sharply defined edges of the aperture stop. With the phase mask alone, this Fresnel diffraction pattern varies significantly with the out of focus error and produces distortion in the final recovered image. The amplitude mask also produces a beneficial smoothing of the system PSF and the associated OTF.

Ideally the optical system would be designed with both the amplitude mask and the phase mask placed at or near one of the optical system principal planes. It is also desirable that the optical system be designed with the exit pupil at or near one of the principal planes. The amplitude mask may take the form of a single stand alone element or may be combined with another optical surface. It may even take the form of a coating on another optical element such as a lens or phase mask. In addition, while an amplitude mask having a Gaussian transmission characteristic may be optimal for some applications, amplitude masks having non-Gaussian characteristics may also be used, provided that they are substantially free of sharply defined boundaries. It will be understood that all such amplitude mask configurations and their equivalents are within the contemplation of the invention.

The parts of the optical assembly other than the amplitude mask may also have a variety of different configurations. The phase mask, for example, may be located at or near either of the two principal planes of the associated lens or lenses. It may also be either a stand alone element or be incorporated into a lens to produce a composite structure that has both phase masking and focusing functions. It should be understood that design compromises may have to be made in selecting an optimum location for the amplitude and phase masks. The amplitude mask may also be added as a coating on a composite structure so as to produce a single optical element that is able simultaneously to perform phase masking, amplitude masking and focusing functions. While the different numbers and configurations of the elements that perform these functions may be important from a cost standpoint, they are not important for purposes of the present invention. This is because the operation of the invention is determined by the generalized pupil friction of its optical assembly as a whole, i.e., the pupil function which the optical assembly would have if all of its optical attributes and aberrations were referred to its exit pupil, as discussed for example in "Introduction to Fourier Optics, W. Goodman", Second Edition, 1996, page 139. This is also because optical assemblies having very different physical structures can have substantially the same generalized pupil functions. It will be apparent to those skilled in the art that these optical attributes could equally well be referred to an image of the exit pupil, such as an entrance pupil. It will therefore be further understood that the apparatus of the invention is not limited to any particular number or configuration of physical elements, and that all numbers and configurations of elements which have similar generalized pupil functions are equivalent to one another for purposes of the present invention.

To the extent that the method and apparatus of the invention is directed to bar code reading applications, the generalized pupil functions and recovery functions that are useful therein may be divided into two basic types, namely: 1D pupil and recovery functions and 2D pupil and recovery functions. In spite of the apparent fundamental differences between these types of functions, there is an even greater underlying similarity and parallelism therebetween. The 2D masks, lenses, and image sensors of 2D imaging systems are paralleled by the 1D masks, lenses and image sensors of 1D imaging systems, although hybrid imaging systems, such as those having 2D optical assemblies and 1D image sensors, are also used. Similarly, in common usage, the point spread functions of 2D optical systems are in some ways analogous to the line spread functions of 1D imaging systems. In order to avoid including two different but parallel descriptions of such closely related imaging systems, some parts of the following description will be framed in terms of 1D imaging systems while other parts will be framed in terms of 2D imaging systems, depending which best elucidates the topic being discussed. Whichever type of imaging system is being discussed, however, it will be understood that statements framed in terms of one type are equally applicable to the other type, except where otherwise specifically indicated, provided that allowances, of a type that would be apparent to those skilled in the art, are made for changes in terminology.

DESCRIPTION OF THE DRAWINGS

Other objects and advantages of the invention are presented in the following description and drawings, in which:

FIG. 10 includes selected equations that illustrate terms and functions that are used in producing the recovery function of the invention;

DESCRIPTION OF PREFERRED EMBODIMENTS

Figure 1:
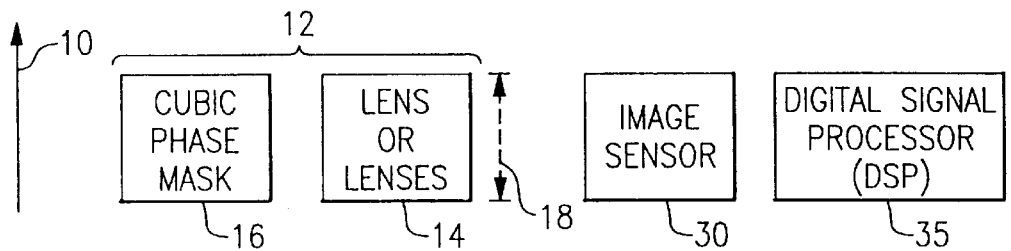
FIG. 1 is a high level block diagram of a prior art imaging system that includes a cubic phase mask and a digital signal processor that uses a known recovery function and a known image recovery algorithm.

Referring to FIG. 1 there is shown a prior art imaging system which is configured to produce a digital representation of an object 10. This imaging system includes an optical assembly 12 having a lens or set of lenses 14 and a phase mask 16 which is preferably, although not necessarily, of the cubic type or at least of the type which can be specified in terms of a third order polynomial. The exit pupil of optical assembly 12 may be defined either by an aperture stop (not shown) or by the lateral dimensions of one of its lenses, as indicated generally by the dotted line labelled 18. The imaging assembly of FIG. 1 also includes an opto-electronic image sensor 30 for receiving the real intermediate image of object 10 formed thereon by optical assembly 12, and converting that light image into an intermediate image signal which, after undergoing an analog to digital conversion, becomes a digital intermediate image signal that is made up of a number of discrete image data elements. Finally, the imaging system of FIG. 1 includes a digital signal processor (herein often abbreviated to DSP) that stores and post-processes the image data elements of the intermediate image signal to produce a set of final image data elements which has been corrected in the manner described in U.S. Pat. No. 5,478,371, which is hereby incorporated herein by reference.

As explained in the above-mentioned patent, phase mask 16 is placed at a principal plane of lens 14, and causes the OTF of the imaging system to remain approximately constant over some range of distances from the in-focus position. DSP 35 stores and post-processes the intermediate image signal produced by image sensor 30 to produce a corrected digital recovered (final) image signal which has a reduced amount of out of focus error over a range of distances. This is stated to be accomplished by implementing a recovery function that is based upon an approximated system OTF.

While post-processing of the intermediate image signal of the imaging system of FIG. 1 in this manner does reduce the out of focus error thereof, the magnitude of this reduction is suboptimal. In particular, the system OTF approximation fails to take into account an abrupt change in phase at the origin of the incoherent OTF (as defined in the above cited patent) that is produced by the cubic phase mask. This, in turn, causes the final image produced by DSP 35 to have substantial distortion.

In addition to including the above-mentioned residual out of focus error, the recovered images produced by the imaging system of FIG. 1 will include the uncompensated errors introduced by the elements of its optical assembly. These errors may include coma associated with lens 14 and diffraction errors produced by aperture stop 18, among others. Together with the partly corrected out of focus error, these errors can result in recovered images which are too distorted to be useful in devices, such as optical readers, which operate best when they are presented with images that have sharply defined black-white and white-black transitions.

During the making of the invention, it was discovered that there exists a deficiency in the above-discussed method for reducing out of focus error, and that this deficiency can be corrected in a way that simultaneously corrects for a variety of other imaging system errors. It was also discovered that this more powerful and more inclusive type of correction can be accomplished without significantly increasing the amount of image processing that must be done. As will be explained more fully later, the method of the invention in part involves the making of improvements to the optical assembly of the imaging system, and in part involves the making of improvements to the techniques used in post-processing the image signal produced thereby.

Figure 2:
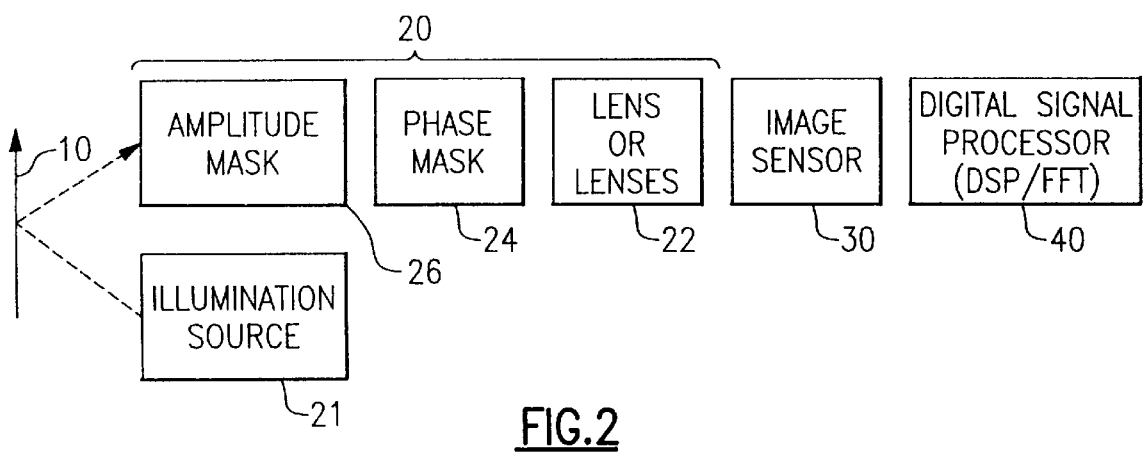
FIG. 2 is a high level block diagram of an imaging system that includes an optical assembly constructed in accordance with the invention and a digital signal processor that uses the generalized recovery flnction and recovery algorithm of the invention.

In FIG. 2 there is shown the overall configuration of an imaging system constructed in accordance with the method and apparatus of the invention. The imaging system of FIG. 2 includes an incoherent illumination source 21, an optical assembly 20 having a lens or set of lenses 22, a phase mask 24, and an amplitude mask 26 which preferably, although not necessarily, has a Gaussian transmission profile. A number of exemplary physical embodiments of optical assembly 20 will be described with reference to FIGS. 3A, 3B, 3C, 5A and 5B. The imaging system of FIG. 2 also includes an image sensor 30 for receiving the intermediate image formed by optical assembly 20 and converting that image into an intermediate image signal that, after A/D conversion, becomes a digital intermediate image signal which is made up of a plurality of discrete image data elements. Finally, the imaging system of FIG. 2 includes a DSP 40 for storing and post-processing the digital intermediate image signal in accordance with a recovery algorithm that uses the improved, generalized recovery function of the invention, this difference being indicated by the assignment of a new number 40. This recovery algorithm and function will be described later with reference to FIGS. 8 and 9A.

Figure 3A:
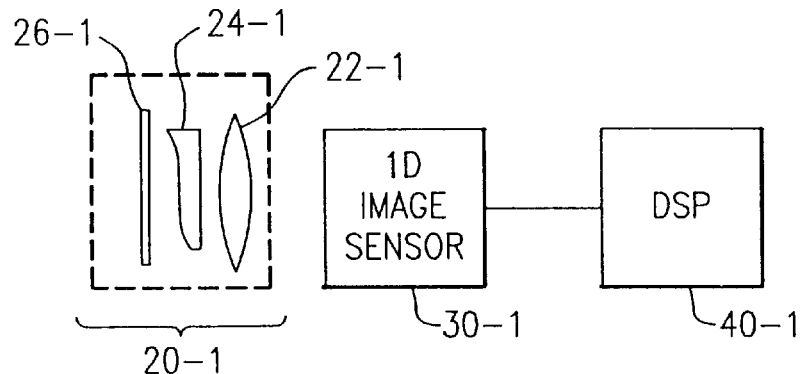
FIGS. 3A and 3B show exemplary embodiments of 1D imaging systems that include optical assemblies and digital signal processors of the type contemplated by the invention.

Referring to FIG. 3A there is shown a side view of a first embodiment of a 1D imaging system constructed in accordance with the invention. This imaging system includes a 1D optical assembly 20-1, a 1D image sensor 30-1, and a DSP 40-1 which is adapted to implement a 1D version of the recovery function of the invention. In the embodiment of FIG. 3A optical assembly 20-1 includes a lens 22-1, a 1D phase mask 24-1 (the curvature of which is greatly exaggerated to clearly show its shape), and a stand alone 1D amplitude mask 26-1. In the preferred embodiment, 1D amplitude mask 26-1 is rectangular in form. As shown in FIG. 3C, the transmittance of mask 26-1 decreases smoothly and continuously as a function of the distance from the center line of the amplitude mask, along the X-axis until it reaches or approximates a value of zero at the X boundaries XI and X2 thereof. This center line is located on the optical axis of optical assembly 20-1. This optical axis is perpendicular to the plane the object shown in FIG. 3C. The transmittance of mask 26-1 is invariant in directions parallel to the Y axis of assembly 20-1 and, when used with a 1D image sensor, approximates an aperture that is unbounded in that direction. Although apertures having other shapes can be used, they result in recovery algorithms or functions that are significantly more complex than those for a rectangular aperture and, consequently, are not preferred.

Phase mask 24-1 is located at or near the front principal plane of lens 22-1 and preferably, although not necessarily, has a phase characteristic which is cubic in form, i.e., which can be specified by a third order polynomial. During imaging, phase mask 24-1 operates in a known manner to cause the OTF of optical assembly 20-1 to remain approximately constant over a range of distances that extends in both axial directions from the location of optimum focus (i.e. towards and away from the lens). In the preferred embodiment, the coefficients of the cubic or third order polynomial function are selected according to the maximum amount of misfocus that the imaging system is designed to accommodate, and are just sufficient to compensate for that degree of misfocus. Even though the phase mask technique can compensate certain other types of errors, such as spherical aberration, it is contemplated in the invention that all such known errors will be compensated, if possible, in the recovery function, and the phase mask technique will be used to correct only misfocus error, which is not known a priori. This assures that the size of the PSF that results from the presence of the phase mask is no larger than is actually required, and does not unnecessarily decrease the signal to noise ratio of the digital intermediate image signal. The magnitude of the cubic phase function parameter is related to the size of the aperture of the optical assembly and the cubic phase coefficient in the manner indicated by Equation 8 of FIG. 10.

Figure 7A:
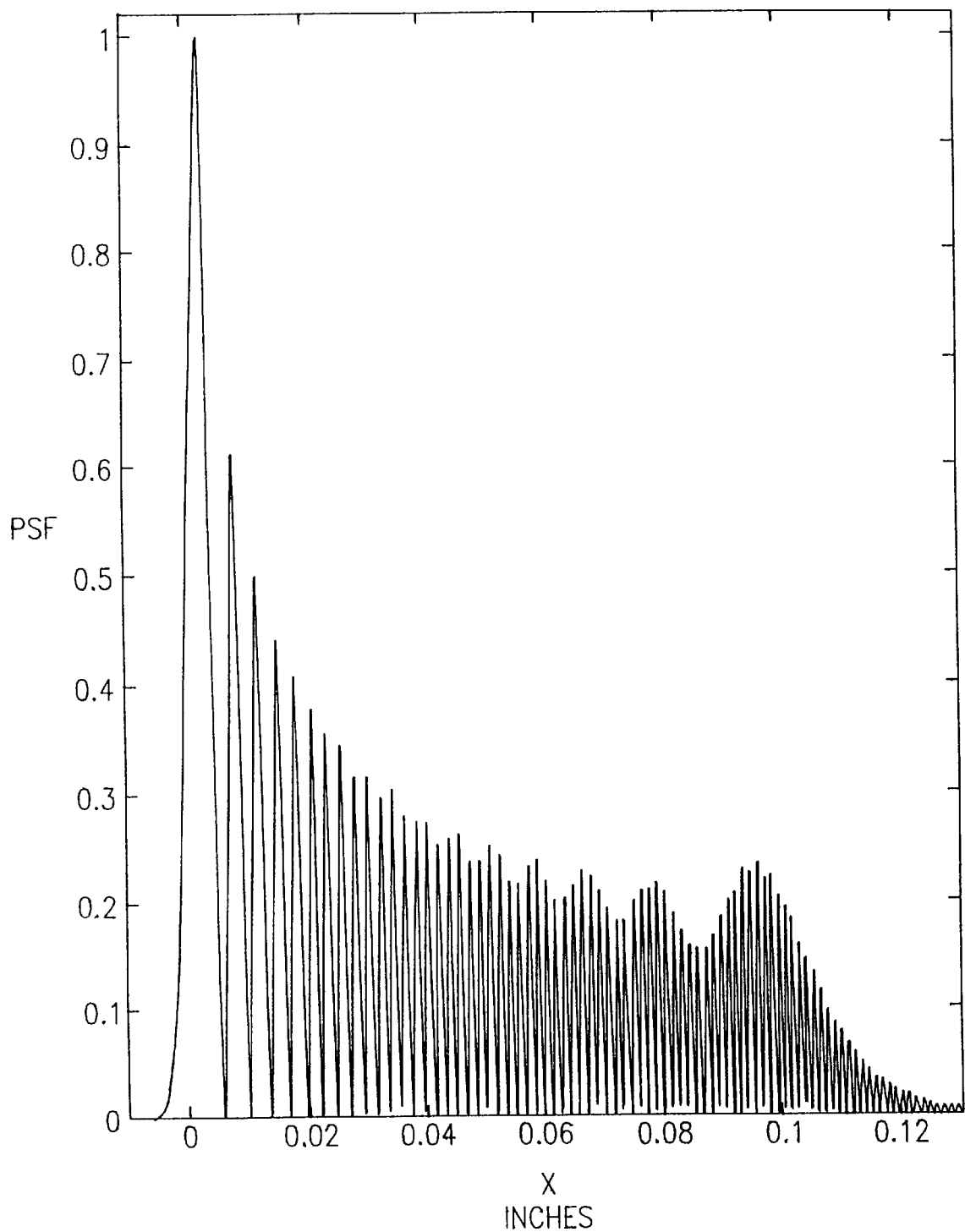
FIG. 7A shows the calculated in-focus line spread function for a 1D imaging system having an optical assembly with a sharply defined aperture and a CPM.
Figure 7B:
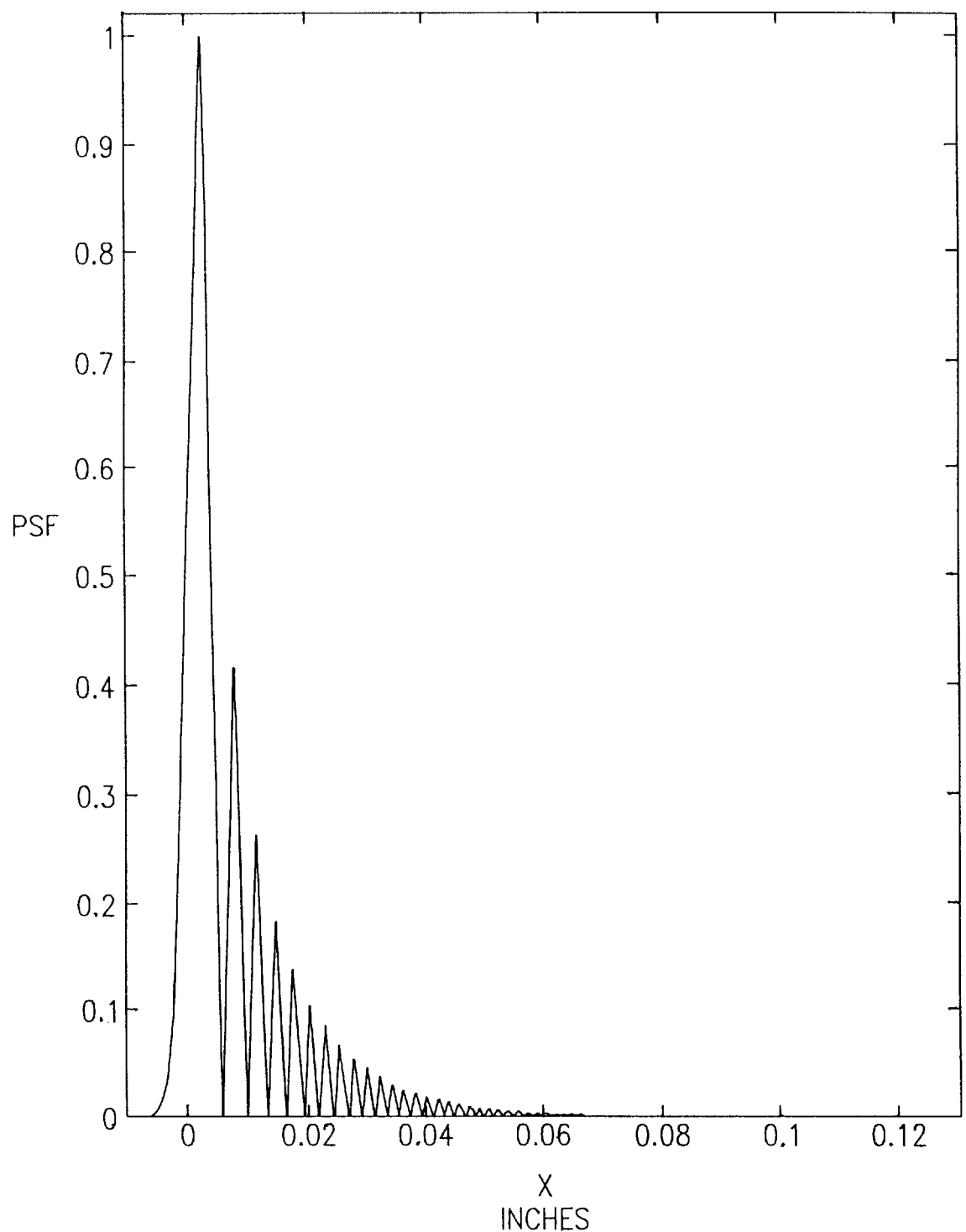
FIG. 7B shows the calculated in-focus line spread function for a 1D imaging system similar to that of FIG. 7A, except that it has an optical assembly which includes an amplitude mask having a Gaussian transmission profile.
Figure 7C:
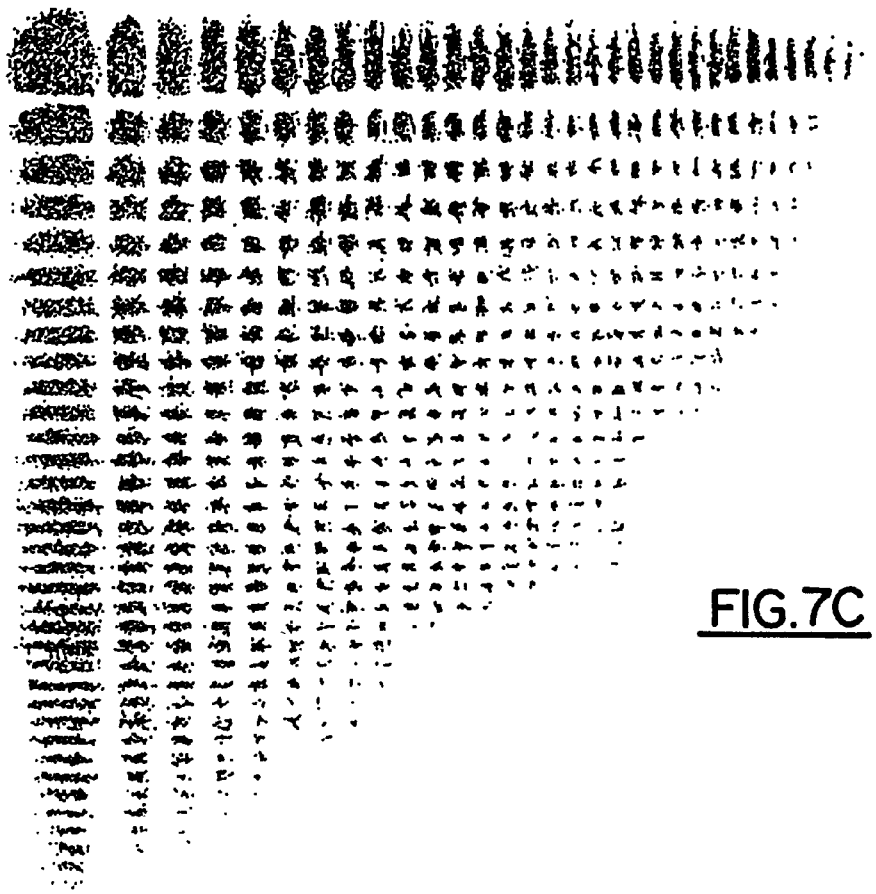
FIG. 7C shows the measured in-focus point spread function for a 2D imaging system having an optical assembly with a sharply defined aperture and a CPM.
Figure 7D:
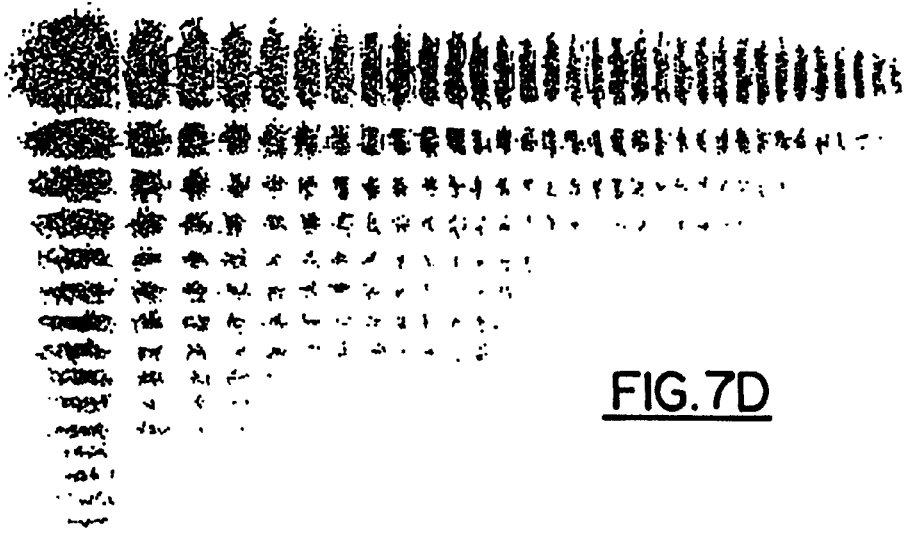
FIG. 7D shows the measured in-focus point spread function for a 2D imaging system similar to that of FIG. 7C, except that it has an optical assembly which includes an amplitude mask having a Gaussian transmission profile.

The presence of amplitude mask 26-1 represents a departure from and improvement over imaging systems that have previously been used in indicia readers. This amplitude mask defines for the imaging system as a whole a "soft aperture" which reduces the magnitude of the diffraction ripples that are associated with the intermediate PSF in optical assemblies that have "hard apertures" i.e., aperture stops with sharply defined edges. This amplitude mask has the effect of smoothing out the intermediate image PSF. This smoothing may be seen by comparing FIG. 7A, which shows the in-focus intermediate image PSF of a 1D optical assembly which has a "hard aperture", and FIG. 7B, which shows the intermediate image PSF of an optical assembly such as that shown in FIG. 3A which includes a 1D Gaussian amplitude mask. Amplitude mask 26-1 that has a Gaussian characteristic provides the additional advantage that it causes the intermediate image PSF to have an envelope shape that does not change as much over a depth of focus as that of an optical system implemented without an amplitude mask. A mathematical function which describes a 1D amplitude mask that has Gaussian characteristics is shown in Equation 4 of FIG. 10.

While FIG. 3A shows amplitude mask 26-1 as a stand alone mask, it is not essential that it be a stand alone element. Mask 26-1 may, for example, be formed on or as a part of phase mask 24-1 or lens 22-1. Mask 26-1 may also be formed as a part of a single, composite element that combines the functions of all of lens 22-1, phase mask 24-1 and amplitude mask 26-1. A single element of this type is shown in FIG. 3D. In the latter figure, a single, composite optical element 27 includes a front surface 22-A which serves as a focusing structure, a rear surface 24-A which serves as a phase mask, and a coating 26-A which serves as an amplitude mask.

If the transmittance of the mask is made to become equal to zero before another optical element, such as a lens, limits the aperture of the optical assembly, then the locus of points at which the transmittance becomes equal to zero defines the aperture stop of the optical assembly, without regard to where the physical edges of the mask are. If the transmittance of the mask has a non-zero value at the edges of the mask, and no other optical element defines a smaller aperture stop for the optical assembly, the edges of the mask define the aperture stop of the optical assembly. In the latter case, the fact that the transmittance is not equal to zero at the edge of the mask does not prevent the mask from establishing the desired soft aperture, provided that the transmittance is small enough to not be of practical significance.

In addition, mask 26-1 may define an amplitude mask having a non-Gaussian transmission profile, provided that the change in its transmittance has a gradient or curvature that decreases smoothly across the width of the mask. Examples of non-Gaussian functions that may be suitable for use in establishing such smoothly decreasing gradients include exponential and Bessel functions, and segments of cosine functions.

Sensor 30-1 may be any of a number of different types of opto-electronic image sensors, including CCD, C1D and CMOS sensors, among others. Sensor 30-1 should have enough photosensitive elements to provide a spatial sampling resolution sufficient to meet the requirements of the application in which the imaging system is used. For many 1D bar code reading applications, an image sensor having an imaging array with 600 or more photosensitive elements will be sufficient. The image data produced by these photosensitive elements taken together comprise an intermediate image signal that corresponds to the real intermediate image that was formed on the imaging array of the image sensor. In order for this intermediate image signal to be post-processed in accordance with the invention, it must first be stored in memory. As a result, the intermediate image signal must have a digital, e.g., gray scale, format. Accordingly, if the image sensor is not one that makes its output available as a digital intermediate image signal, it should be converted to such a signal by a suitable A/D converter.

While the intermediate image appearing at the active surface of image sensor 30-1 is a continuous image, the digital intermediate image signal is a discontinuous image that is made up of a plurality of discrete image data elements. Each of these elements has an amplitude which is proportional to the time averaged result of the superposition of the squares of the absolute values of the coherent PSFs of all points of the object that are projected onto the respective photo sensitive elements. As will be explained more fully later, it is the function of DSP 40-1 to recover a representation of the original object which has been compensated for misfocus and for as many of the errors introduced by the associated optical assembly as is practicable. This operation is referred to herein as the "recovery process" or "recovery algorithm", and makes use of the generalized recovery function of the invention.

Figure 3B:
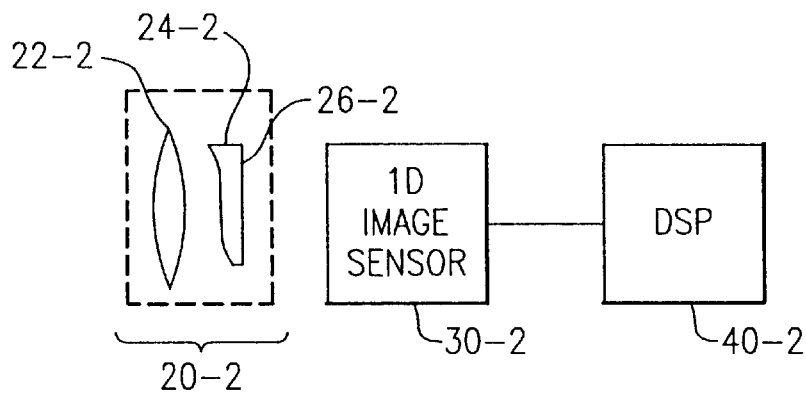
Figure 3C:
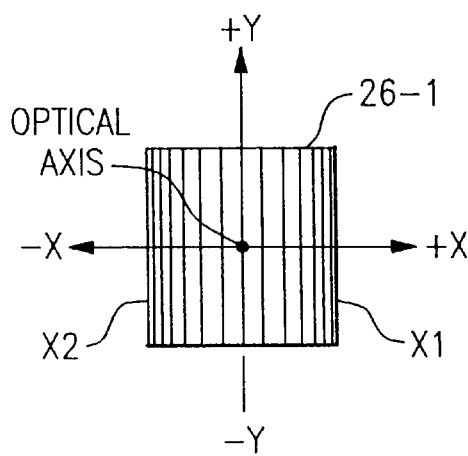
FIG. 3C is a front view of a 1D amplitude mask suitable for use in the embodiment of FIG. 3A.
Figure 3D:
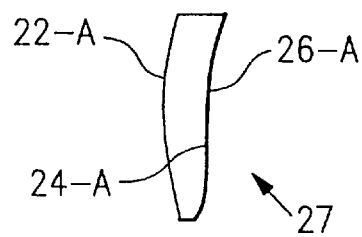
FIG. 3D is a side view of an optical element in which a focusing element, a phase mask and an amplitude mask are formed on different surfaces thereof.

Referring to FIG. 3B there is shown a second embodiment of a 1D imaging system constructed in accordance with the invention. The embodiment of FIG. 3B differs from that of FIG. 3A primarily in that its phase mask 24-2 is located at the rear rather than the front principal plane of its lens 22-2. In addition, the amplitude mask 26-2 of the imaging system of FIG. 3B takes the form of a film deposited on the rear surface of phase mask 24-2. Because the statements made in connection with the embodiment of FIG. 3A are equally applicable to the embodiment of FIG. 3B, the embodiment of FIG. 3B will not be discussed in detail herein.

As will be appreciated by those skilled in the art, it is the 1D character of image sensor 30-1 or 30-2 that is responsible for the fact that the imaging systems of FIGS. 3A and 3B are termed 1D imaging systems. As a result, in spite of the fact that the imaging systems of FIGS. 3A and 3B are 1D imaging systems, optical assemblies 20-1 and 20-2 may be constructed using either 1D or 2D versions of their phase and amplitude masks or any convenient combination thereof. Lenses 22-1 and 22-2, on the other hand, are preferably 2D lenses. It will be understood that all such versions and their equivalents are within the contemplation of the present invention.

Figure 4:
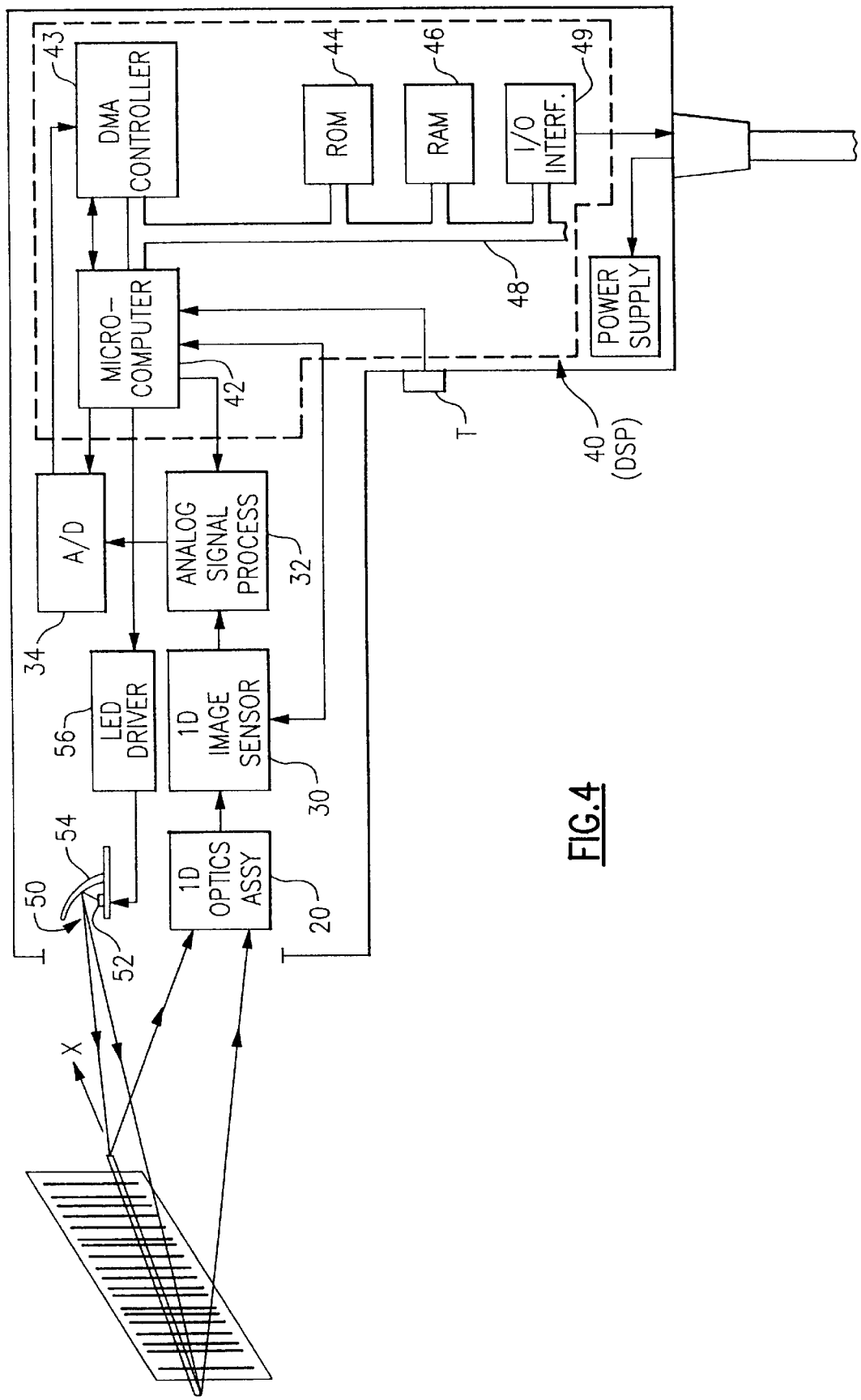
FIG. 4 is an opto-electronic block diagram of a 1D optical reader which includes an imaging system of the type shown in FIG. 3A, or 3B.

Referring to FIG. 4 there is shown a block diagram of an apparatus in which the imaging systems of FIGS. 3A and 3B can be used, namely: a 1D hand held bar code reader. In addition to optical assembly 20 and image sensor 30 this reader includes an illumination system 50 which includes a linear array of LEDs 52 and a focusing mirror 54 together with a suitable LED driver circuit 56. Most of the remainder of the reader of FIG. 4 comprises the circuit elements that have thus far been referred to collectively as DSP 40. These circuit elements include an analog signal processing circuit 32 and an analog to digital converter 34 for converting the analog output signal of image sensor 30 into an intermediate image signal that can be processed using digital methods. These circuit elements also include microcomputer 42, a read only memory (ROM) 44, a read write memory (RAM) 46, and a bus 48 for interconnecting them. A suitable DMA controller 43 may also be included in order to handle the storage of image data, thereby allowing computer 42 to concentrate on the tasks of post-processing the digital intermediate image signal to recover and decode the final image data. The operation of the reader of FIG. 4 will typically be initiated either manually, by means of a suitable trigger T, or non-manually by means of an autotrigger arrangement.

The overall operation of the reader of FIG. 4 is controlled by a program stored in ROM 44. Generally speaking, this program includes a reader control portion, a decoding portion, and an image recovery portion. The reader control portion of the program deals with matters such as the starting and stopping of scanning, and the inputting and outputting of data via an I/O interface 49. The decoding portion deals with matters such as identifying the symbology used in the symbol being read and the decoding of that symbol in accordance with the rules that govern that symbology. Because programs for performing these functions are included in commercially available readers, such as the model numbers ST 3400 and IT 4400 readers sold by the assignee of the present invention, they will not be discussed in detail herein. The image recovery portion of the program will be discussed later in connection with FIGS. 9A and 9B.

Figure 5A:
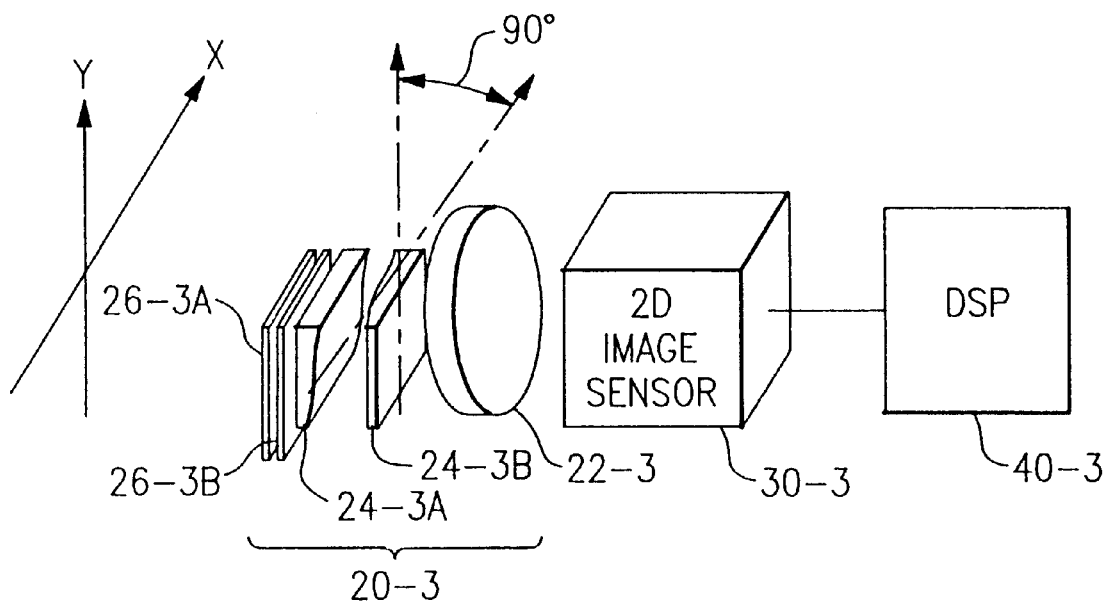
FIGS. 5A and 5B show exemplary embodiments of 2D imaging systems that include optical assemblies and digital signal processors of the type contemplated by the invention.
Figure 5B:
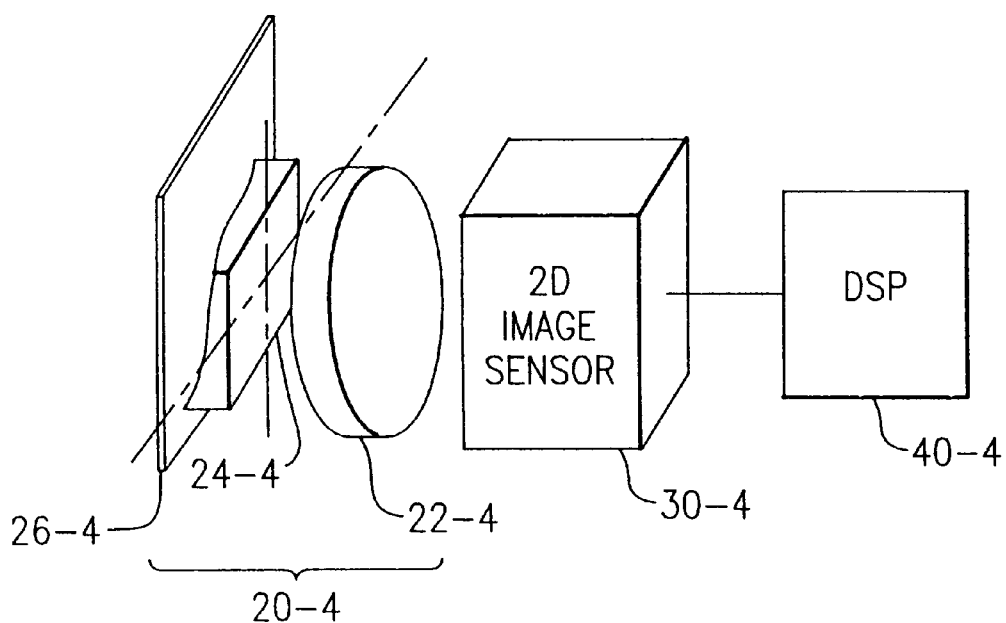

Referring to FIGS. 5A and 5B there are shown two embodiments of 2D imaging systems that are constructed in accordance with the invention. As in the case of the 1D embodiments of FIGS. 3A and 3B, the 2D embodiments of FIGS. 5A and 5B each include an optical assembly, an image sensor, and a DSP, each of which is labelled with the same number used in earlier discussed embodiments, except for changes in postscript. In the embodiment of FIG. 5A, the lens 22-3 is a 2D lens similar to that used in the 1D embodiments of FIGS. 3A and 3B. The phase and amplitude masks of FIG. 5A are similar to their counterparts in FIG. 3A, except that they are preferably square and provide for the additional dimension in a rectilinear manner. The amplitude mask of FIG. 5A is made up of two identical 1D amplitude masks 26-3A and 26-3B which are oriented at right angles to one another. With this angular orientation, the two 1D amplitude masks together function as a 2D amplitude mask. The 2D amplitude mask may also be made as a single element. Similarly, the phase mask of FIG. 5A is made up of two identical 1D phase masks 24-3A and 24-3B which are oriented at right angles to one another. With this angular orientation, the two 1D phase masks together function as a single 2D phase mask to facilitate the compensation of misfocus error in 2D images. The 2D phase mask may also be made as a single element 24-4, as shown in the embodiment of FIG. 5B. Since the other statements made earlier with reference to the optical assemblies of FIGS. 3A and 3B are equally applicable to the optical assemblies of FIGS. 5A and 5B, except for the effect of the added dimension, the optical assemblies of FIGS. 5A and 5B will not be further discussed herein.

Unlike the image sensors shown in FIGS. 3A and 3B, the image sensors shown in FIGS. 5A and 5B are 2D image sensors and, consequently, will have hundreds of times the number of photosensitive elements as their 1D counterparts. In addition, the DSPs of FIGS. 5A and 5B, although not substantially different from their counterparts in FIGS. 3A and 3B from an electrical standpoint, are arranged to use recovery algorithms which can apply either 1D or 2D recovery functions, depending on how they are used. If, for example, a 2D image sensor images a 2D matrix bar code symbol, the reader should apply a 2D recovery function. If, on the other hand, a 2D image sensor images a 1D bar code symbol two-dimensionally, it should also be able to take a 1D slice of the stored representation of that symbol and process that slice in accordance with a 1D recovery function. It will therefore be understood that there is no inherent relationship between the number of dimensions that characterize the recovery functions of the invention and the number of dimensions that characterize the image sensors with which these functions are used.

Although 2D recovery functions are more complex than their 1D counterparts, they are equally familiar to those skilled in the art. Accordingly, in order to avoid needless repetition, the present description will frame its discussion of the recovery algorithm and its recovery function in terms of a 1D intermediate image signal, and leave it to those skilled in the art to adapt the description as necessary to process a 2D intermediate image signal.

A specific example of a 2D optical assembly that includes an amplitude mask that is suitable for practicing the present invention is shown in Table 1 below.

TABLE 1

(Reference the equations of FIG. 10)

| | |
|---|---|
| C03 = 0.0787 (1/inch)$^2$ | cubic coefficient for CPM |
| n = 1.489 | refractive index of CPM (acrylic) |
| f = 7.93 inch | focal length of biconvex lens |
| λ = 660 nm | wavelength of light |
| p = q = 15.859 inch | image and object distances |
| element separation = 7.4 um | SONY ICX084AL 2D imager element |
| separation imager array = 659 × 494 elements | imager array format |
| σ = 0.239 inch | Gaussian coefficient |

Figure 6:
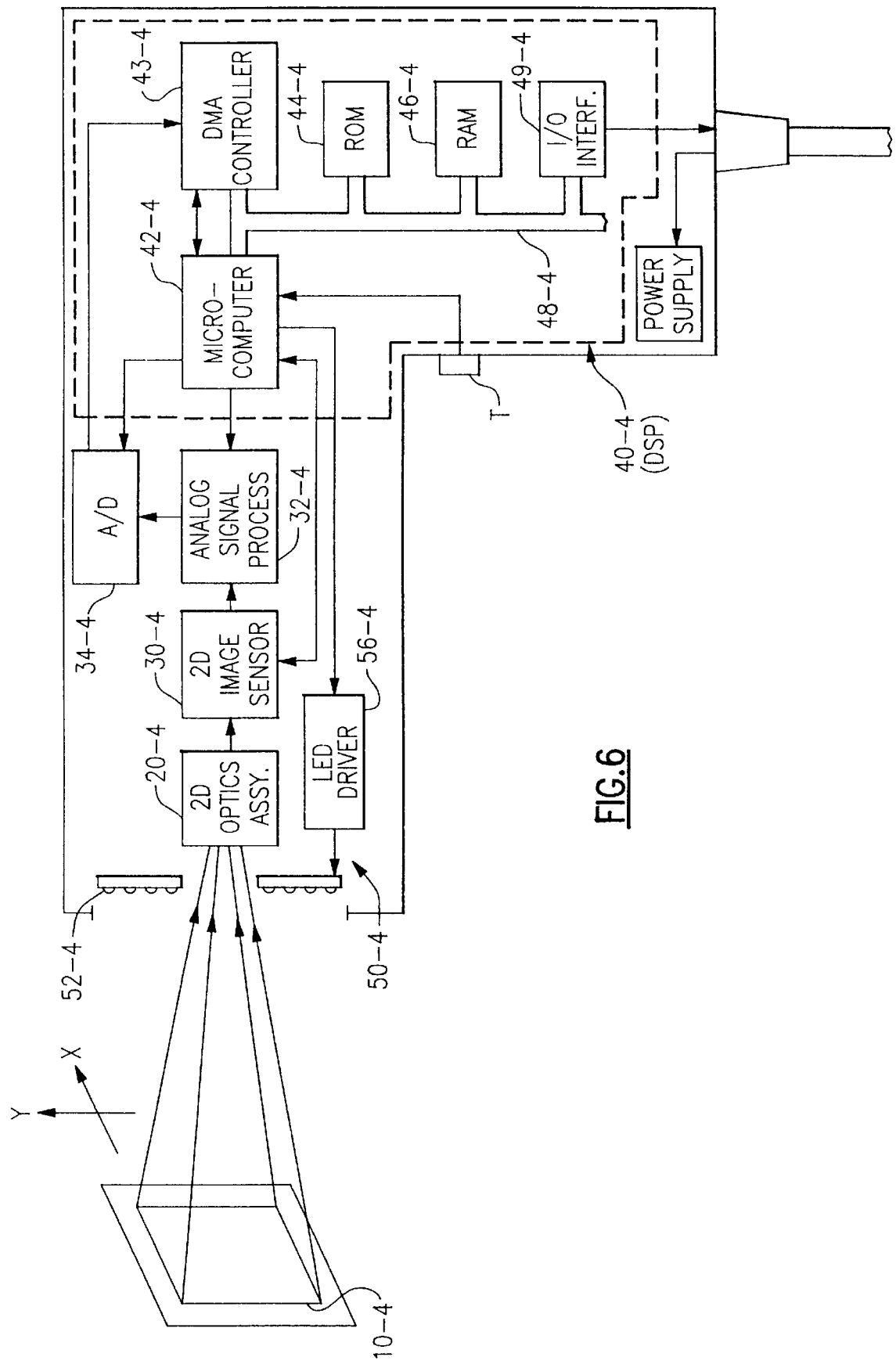
FIG. 6 is an optical-electronic block diagram of a 2D optical reader which includes an imaging system of the type shown in FIG. 5A or 5B.

Referring to FIG. 6, there is shown an opto-electronic block diagram of one exemplary 2D bar code reader that is suitable for use with the present invention. In addition to a 2D optical assembly and a 2D image sensor, such as 20-4 and 30-4 of FIG. 5B, this reader includes an illumination system 50-4 which includes a 2D array of LEDs 52-4 together with a suitable LED driver circuit 56-4. Most of the remainder of FIG. 6 comprises the circuit elements which have thus far been referred to as DSP 40-3 or 40-4. These circuit elements include an analog signal processing circuit 32-4 and a A/D converter 34-4 for converting the output signal of image sensor 30-4 into a digitally processable representation of the 2D intermediate image of object 10-4. These circuit elements also include microcomputer 42-4, a ROM 44-4, a RAM 46-4 and a bus 48-4 for interconnecting them. A suitable DMA controller 43-4 may also be included to handle the storing of 2D image data, thereby allowing computer 42-4 to concentrate on the tasks of post-processing the image data to recover and decode the final image. Since a DMA controller of this type is used in known, commercially available bar code readers, such as in the earlier mentioned model IT 4400 reader, this controller will not be further described herein.

Because a 2D image includes thousands of image data elements, and because these data elements will ordinarily be processed using a suitable transform pair, such as the Discrete Fast Fourier Transform (DFFT) and Inverse Discrete Fast Fourier Transform (IDFFT), the DSP of the invention may also include a dedicated circuit, which may take the form of an ASIC, for performing these transforms. Equivalently, the DSP may be provided with a second, general purpose DSP (not shown) which is dedicated to executing the routines which implement the DFFT-IDFFT transform pair, and making the results available to main DSP 42-4. If such a second DSP is used, other tasks, such as the application of the recovery function and the execution of decoding programs may be divided up in various ways between them. It will therefore be understood that the present invention is not limited to the use of any particular number of microcomputers and/or DSPs or to any particular allocation of tasks among them, and that all such numbers and allocations are within the contemplation of the invention if they use the image recovery techniques discussed herein or their equivalents.

The overall operation of the reader of FIG. 6 is controlled by a program stored in ROM 44-4. Generally speaking, this program includes a reader control portion, a decoding portion and an image recovery portion. As in the case of the 1D reader of FIG. 4, the reader control and decoding portions of 2D reader of FIG. 6 are of types known to those skilled in the art and will not be discussed in detail herein. The image recovery function, and the overall image recovery process of which the recovery function forms a part, will now be described with reference to FIGS. 8 through 10.

Figure 8:
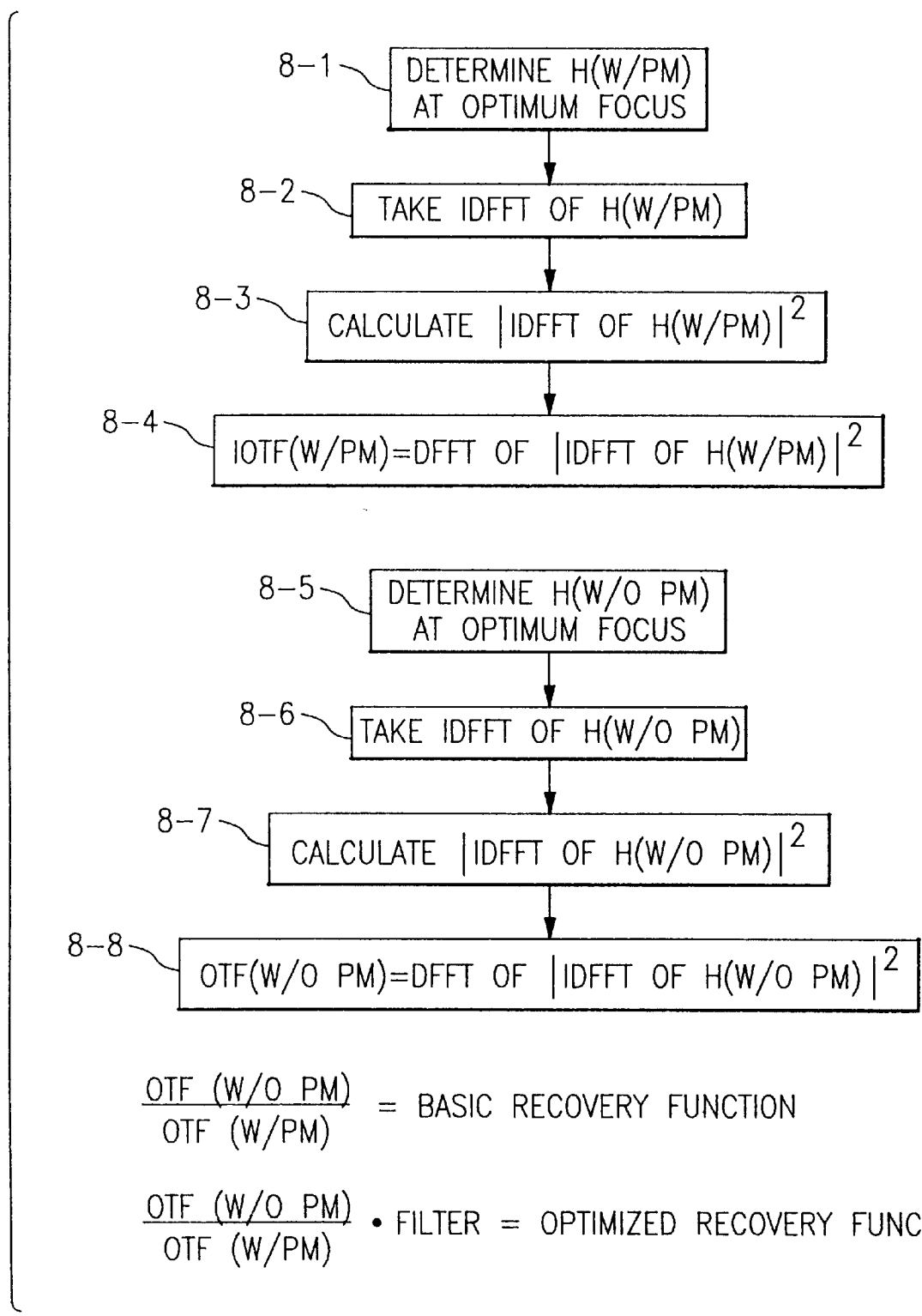
FIG. 8 illustrates the steps used to produce exemplary forms of the recovery function of the invention.

Referring to FIG. 8, there is shown a high level representation of one exemplary sequence of steps that may be used to produce the preferred embodiment of the generalized recovery friction of the invention. The first of these steps, 8-1, comprises the determination of the calculated generalized pupil function of the optical assembly as it exists under a condition of approximately optimum focus, with the phase mask in place, a quantity which will be referred to herein as H(W/PM). This pupil function is equal to the product of a plurality of terms, each of which comprises a mathematical function that specifies a respective one of the characteristics of the elements of optical assembly 20. Principal among these functions are: an aperture function which mathematically describes of the amplitude mask 26 and the effect of other optical elements, if any which act as an aperture stop, a phase mask function that mathematically describes phase mask 24, and a lens function 22 that mathematically describes the lens. In the event that the amplitude mask alone defines the aperture stop of the optical assembly, as may be the case when the transmittance of the mask is made to equal zero before its physical boundaries are reached, the aperture function becomes the same as the function which mathematically describes the amplitude mask, and may properly be referred to as an amplitude mask function. This pupil function may also include, other terms (other than an out of focus term) that mathematically describe effects which are able to introduce errors into the image which the optical assembly produces on image sensor 30, such as spherical aberrations or astigmatism in the entire optical system (such as the window). An out of focus term is not included because, as stated earlier, the calculated pupil function is calculated under a condition of approximately optimum focus. The specific focus conditions are not known a priori and therefore can not be put into a generalized recovery function. The recovery function is calculated from the calculated pupil function. Since the recovery function can reduce the error associated with an effect only if that effect is taken into account in the calculated pupil function, it is desirable to include in the calculated pupil function terms that represent as many error producing effects as is practicable.

The mathematical expression which describes the pupil function depends on the actual sizes, shapes and locations of each physical element that forms a part of the optical assembly, and cannot therefore be written out in exact numerical form independently of the optical assembly to which it relates. It can, however, be written out in symbolic form and, when so written out, has the general form and includes terms such as those shown in Equation 1 in FIG. 10. Examples of equations that show the mathematical forms of the terms that are included in Equation 1 are included as Equations 4 through 6 of FIG. 10. Of these, Equation 4 shows a Gaussian amplitude mask function, Equation 5 shows a cubic phase mask function, Equations 6 and 7 together show aberration functions. Further information concerning the last mentioned function may be found on page 2–19 of Handbook of Optics, edited by W. G. Driscoll and W. Vaughan, McGraw-Hill, 1978. This formulation assumes that all of the physical objects in the optical assembly can be considered to be located in the plane of the exit pupil. If this is not the case, then the mathematical functions describing the individual objects can be mapped or referred to the plane of the exit pupil. Those skilled in the art will understand why this is desirable and how it can be accomplished.

After the approximately in-focus generalized pupil function has been determined, the next step in producing the recovery function of the invention is to produce a mathematical representation of the incoherent optical transfer function (IOTF) of the optical assembly at approximately best focus, with the phase mask in place, a quantity which will be referred to herein as IOTF(W/PM). This representation may be generated in either of two ways. One is to calculate the autocorrelation function of H(W/PM) directly, using equations known to those skilled in the art as, for example, is described on page 139 of the above-cited book by Goodman. An equation of this type is included herein as Equation 2 of FIG. 10. Although this calculation is time consuming, its use is practical because it need be done only once, during the design phase of a new imaging system, rather than each time a new image is to be processed. The second, preferred way of producing the IOTF includes carrying out steps 8-2 through 8-4 of FIG. 8. These include taking the IDFFT of H(W/PM), squaring its absolute value, and taking the DFFT of that squared absolute value. These and all substantially equivalent methods for generating the IOTF(W/PM) of the optical assembly will be understood to be within the contemplation of the invention.

In the spatial frequency domain, the inverse (in the sense of reciprocal) of the IOTF(W/PM) may be used by itself as the recovery function, albeit in its simplest, least practical form. Although this form may be viable in principle, it is not practical for use in real systems because of the impact of noise, truncation errors, and other calculation errors. A more practical form of the recovery function can be produced, however, if IOTF(W/PM) is used as the denominator of a fraction, the numerator of which is the IOTF without the phase mask, or other aberrations at approximately optimum focus, namely IOTF(W/OPM). As in the case of the IOTF (W/PM), the IOTF(W/OPM) may be produced by calculating the ideal generalized pupil function without the phase mask, error or aberrations, but with the amplitude mask of the optical assembly, H(W/OPM), as shown in step 8-5 of FIG. 8, and then either taking the autocorrelation of H(W/OPM) or performing the steps 8-6 through 8-8 of FIG. 8. When the result, IOTF(W/OPM), is divided by IOTF(W/PM), as shown in FIG. 8, the resulting fraction comprises the basic recovery function of the present invention. The use of this recovery function will be discussed presently in connection with FIGS. 9A and 9B.

When calculating the numerator and/or denominator, it will be understood that for a specific practical application one may want to optimize the system about a position other than the position of optimum focus. It will be understood that the use of the non-optimum focus condition for the generation of a recovery function is also within the scope of this invention.

The above-discussed, basic recovery function of the invention may be further improved by multiplying it by a further filtering, waveshaping or finishing function, hereinafter referred to as FILTER, which serves to optimize the basic recovery function by altering the shape thereof, and thereby giving it a more "finished" form. This filtering function is a function which may be arrived at either empirically or by calculation, and which takes into account the problems associated with particular applications. These may include problems such as image contrast, the diffusion effect, quantization error, off-axis error and the effect of sparse sampling. The mathematical form of an exemplary filter function of this type is shown in Equation 3 of FIG. 10.

Figure 9A:
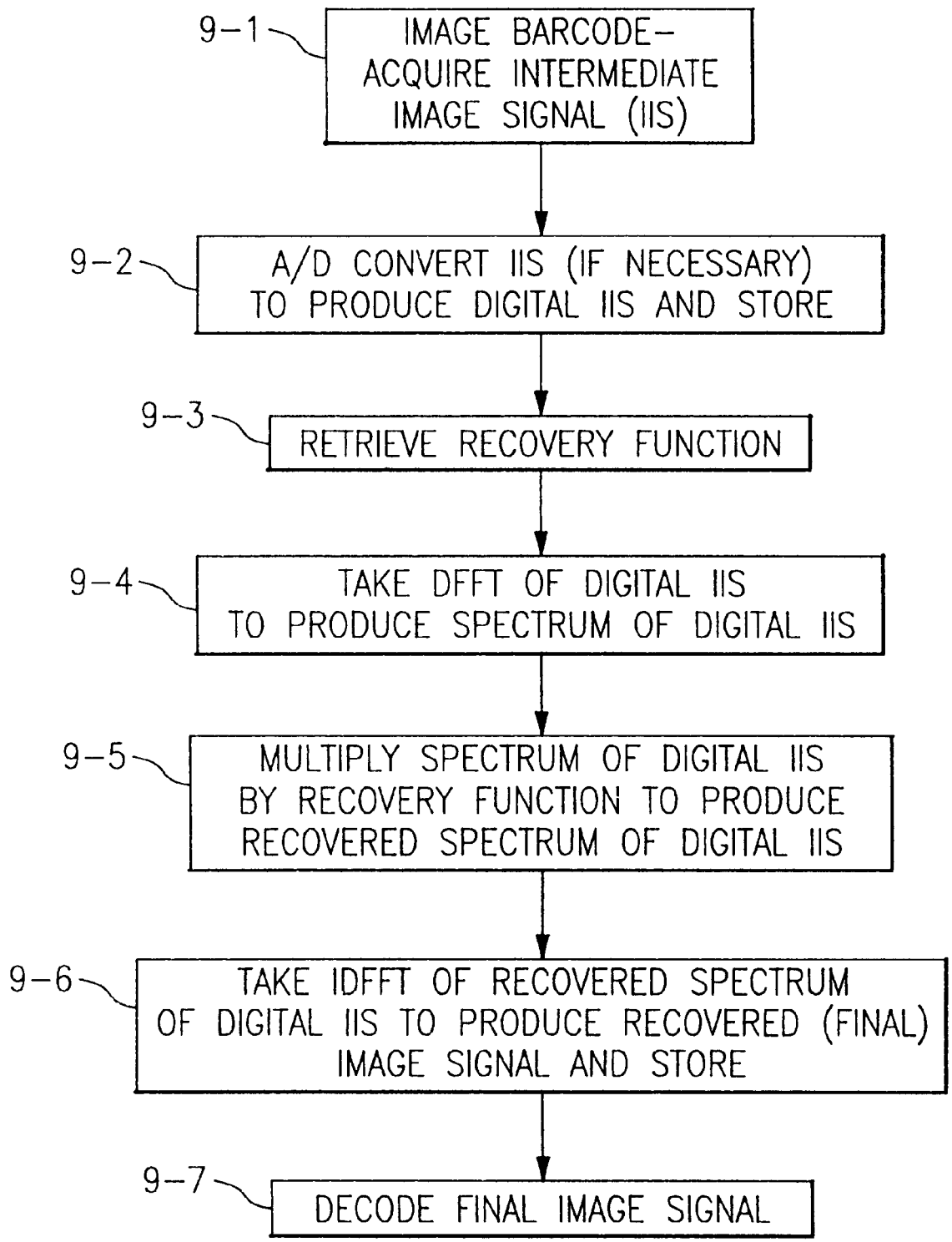
FIG. 9A illustrates the steps used in applying the recovery function of the invention in the spatial frequency domain.

Referring to FIG. 9A, there is shown an exemplary embodiment of a method for using the recovery function of the invention, in this case a method for using it to read a bar code symbol. In FIG. 9A, the first step 9-1 includes the step of acquiring the image to be read. In the 2D reader of FIG. 6, this step includes the illumination of the target symbol, the formation of an intermediate image having an unknown degree of misfocus on image sensor 30-4, and the conversion of that image into an intermediate image signal (IIS). In step 9-2, this IIS is converted to a digital IIS (if necessary) by A/D converter 34-4 and stored in RAM 46-4, preferably as an array or matrix of gray scale image data values, and thereby made available for post-processing. In the embodiment of FIG. 9A, this post-processing includes the use of the recovery function in the spatial frequency domain and the use of an IDFFT to return the results to the spatial domain for final bar code decoding. This post-processing may also be performed in the spatial domain, as will be explained later in connection with the embodiment of FIG. 9B.

In step 9-3 of FIG. 9A the recovery function, preferably with a filtering function appropriate for the application, is retrieved from ROM 44-4, where it was stored at the time of manufacture, and made available to the processor which will use it (step 9-3). A DFFT is then performed on the stored digital IIS (step 9-4) and the resulting spectrum of the digital IIS, which takes the form of an array or matrix of complex numbers, is multiplied by the recovery function (step 9-5), on an element by element basis, to produce a recovered spectrum of the digital IIS. In accordance with the invention, the latter spectrum comprises a spatial frequency domain representation of the read image which is compensated for the unknown degree of misfocus and other sources of error that were taken into account in the recovery function . Once this recovered spectrum is available, an IDFFT is performed thereon to produce a recovered or final image signal (step 9-6). Once this recovered image signal is stored in memory, it is ready for decoding in a manner known to those skilled in the art (step 9-7).

Figure 9B:
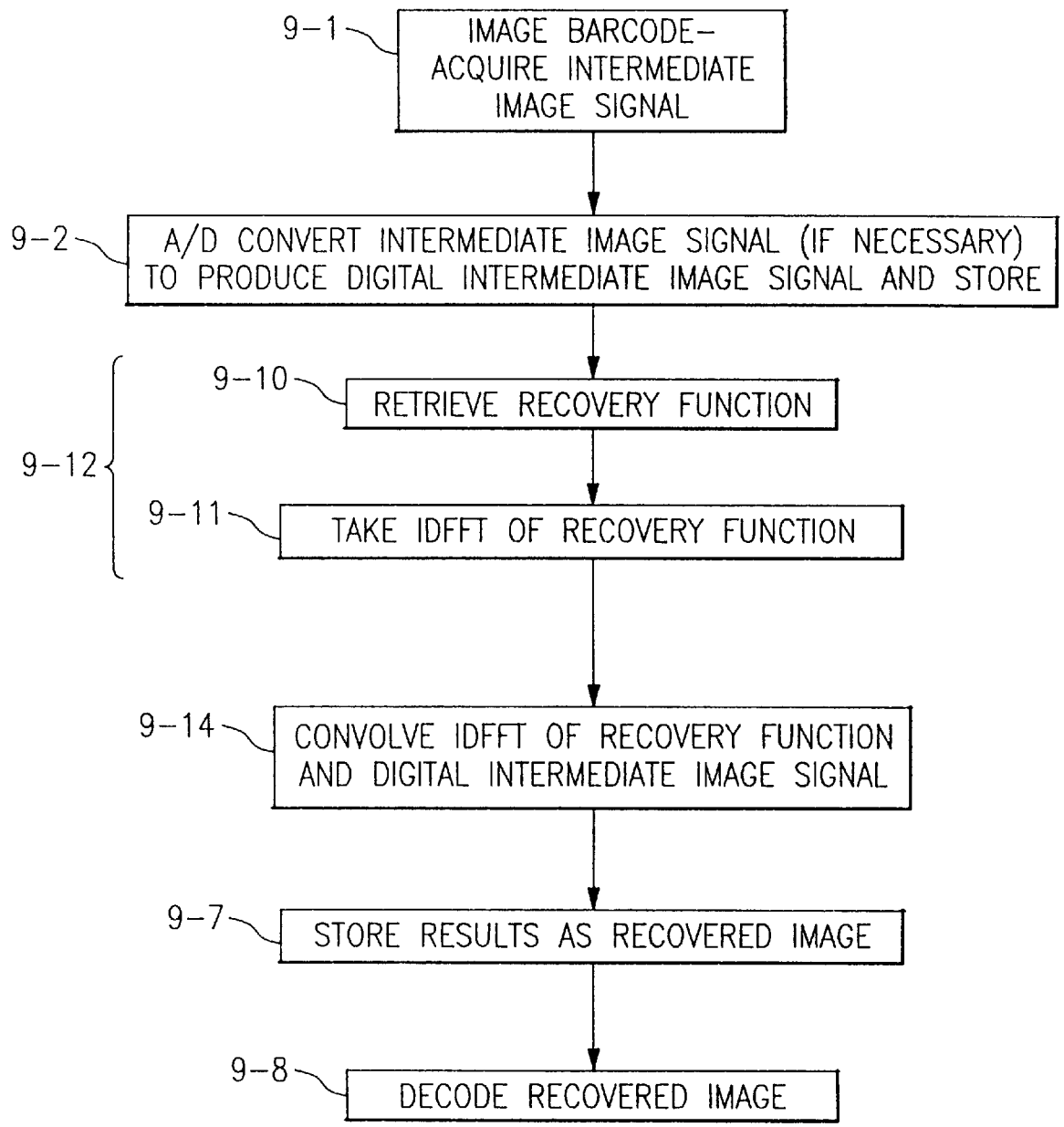
FIG. 9B illustrates the steps used in applying the recovery function of the invention in the spatial domain.

FIG. 9B illustrates how the method and apparatus of the invention may be practiced in the spatial domain. The first two steps, 9-1 and 9-2, the acquisition, conversion and storage of an intermediate image are the same as those discussed in connection with FIG. 9A. The next two steps, 9-10 and 9-11, may include the accessing of the recovery function of the invention, as defined in FIG. 8, and the taking of the IDFFT thereof to produce a spatial domain representation of that recovery function. Alternatively, if the IDFFT is generated and stored in the reader at the time of manufacture, the latter steps may be combined into a single step 9-12, which comprises the retrieval of the spatial domain representation of the recovery function.

Once the spatial domain representations of the digital IIS and the recovery function are both available, the latter is applied to the former in step 9-14 to produce a spatial domain recovered image signal by convolving the recovery function with the digital IIS. If the optical system is not shift or spatially invariant, the convolution integral should not be used, and the more general superposition integral be used instead. Since both of these integrals are well known to those skilled in the art, the particulars of the application thereof will not be discussed in detail herein. Similar conditions will be understood to apply to the spatial frequency domain representation of the digital IIS, i.e., the spectrum of the digital IIS. More particularly, if the optical system is not shift or spatially invariant, then the Fresnel approximation to the Kirchoff or the Rayleigh-Sommerfeld equations (See page 51, equation 3–48 of the earlier mentioned Goodman reference) which permits the use of the Fourier transform method is probably not valid, and full diffraction theory must be used instead.

The recovery methods illustrated in FIGS. 9A and 9B will be understood to be substantially equivalent to one another. This is because multiplication in the spatial frequency domain is the equivalent of convolution in the spatial domain via the convolution theorem for Fourier transforms. This equivalence does not, however, mean that the use of the methods of FIGS. 9A and 9B are equally easy to use, or that the DSPs which apply them use similar amounts of memory or operate with equal speed. In practice, the recovery function is usually more easily and quickly applied in the spatial frequency domain. Accordingly, the embodiment of FIG. 9A is regarded as the preferred embodiment of the method and apparatus of the invention.

Figure 11:
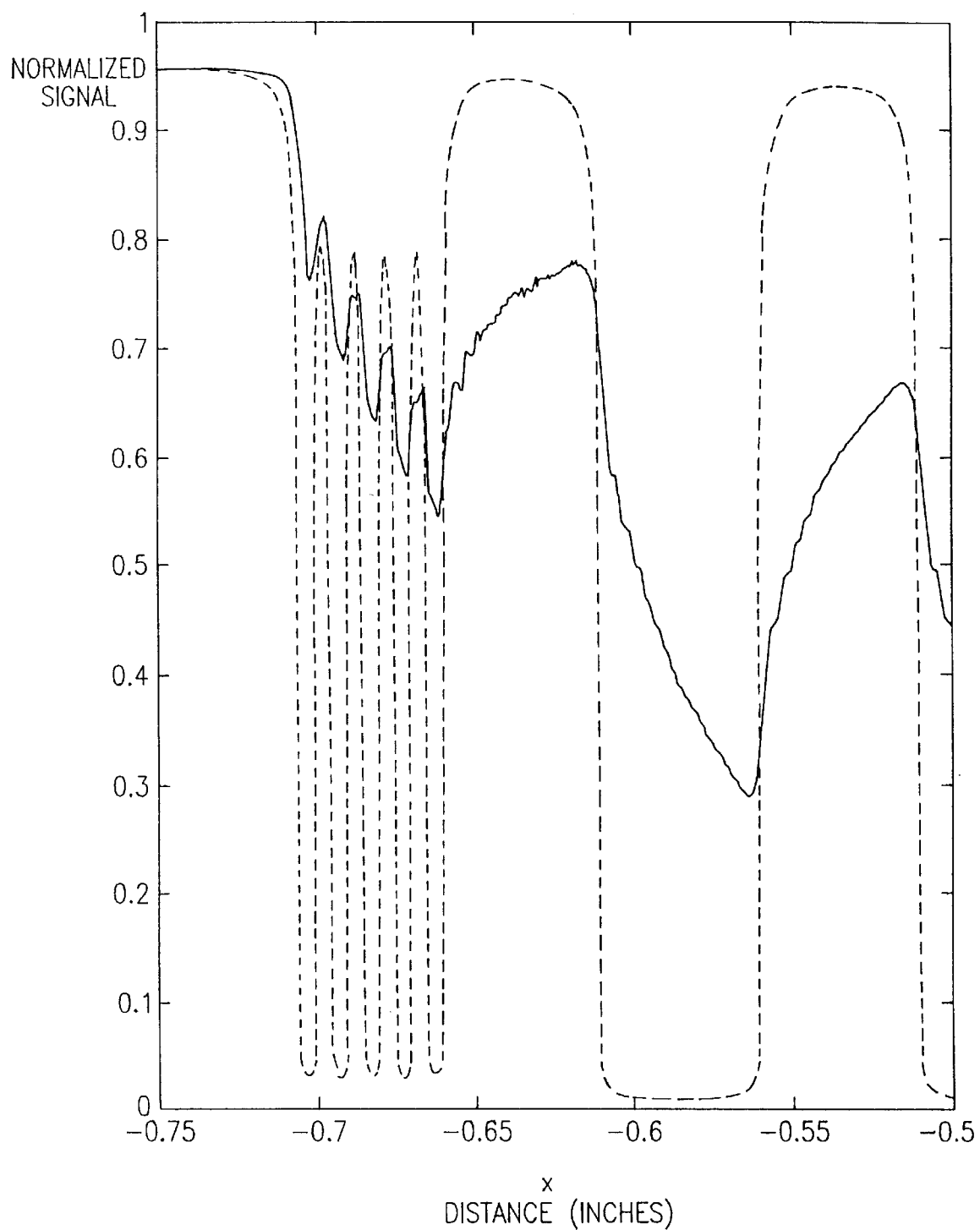
FIGS. 11 and 12 show the calculated intermediate and final image signals which are produced when the 1D imaging system of the invention is used with the recovery function, but without the amplitude mask of the invention.
Figure 12:
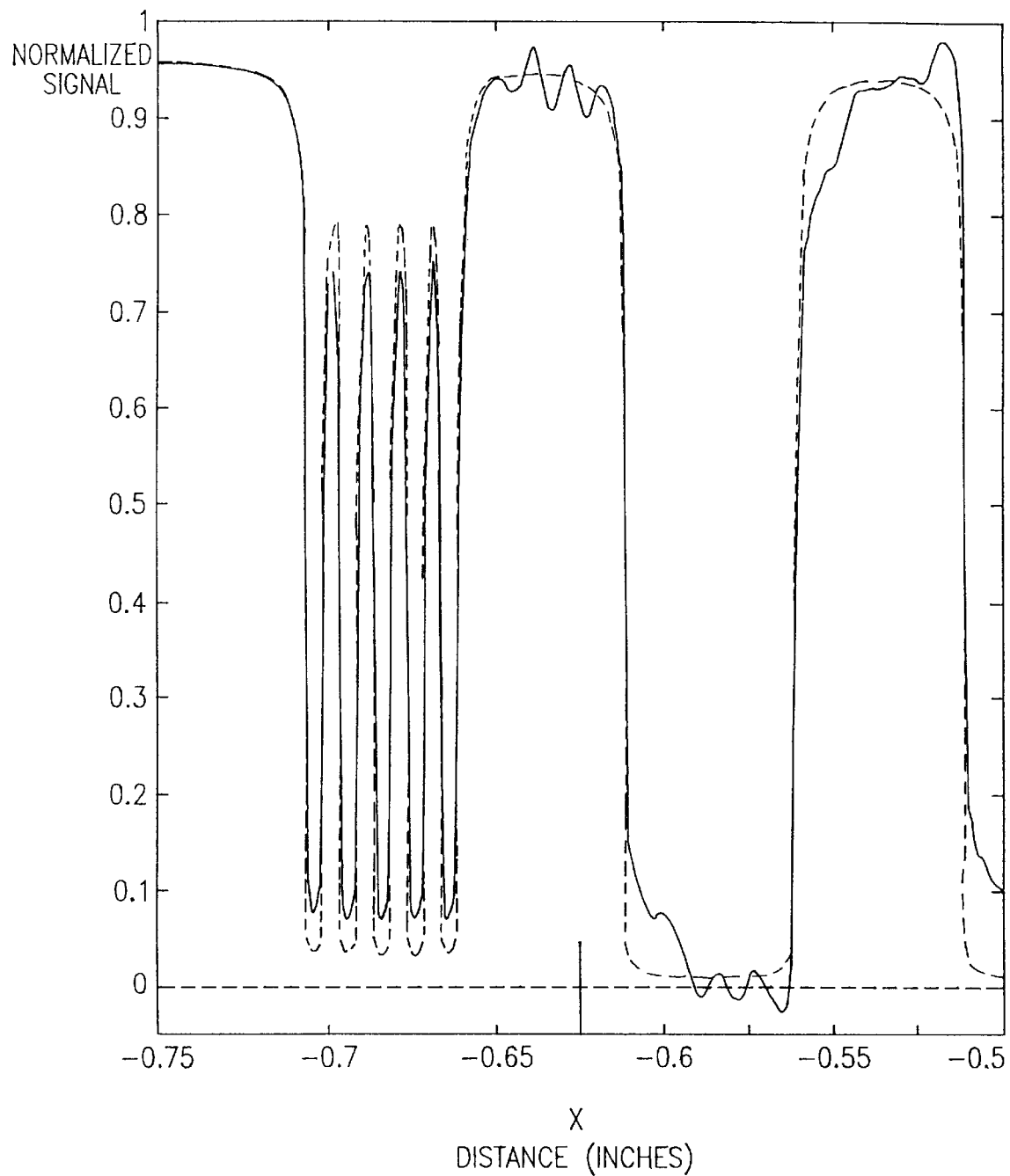
Figure 13:
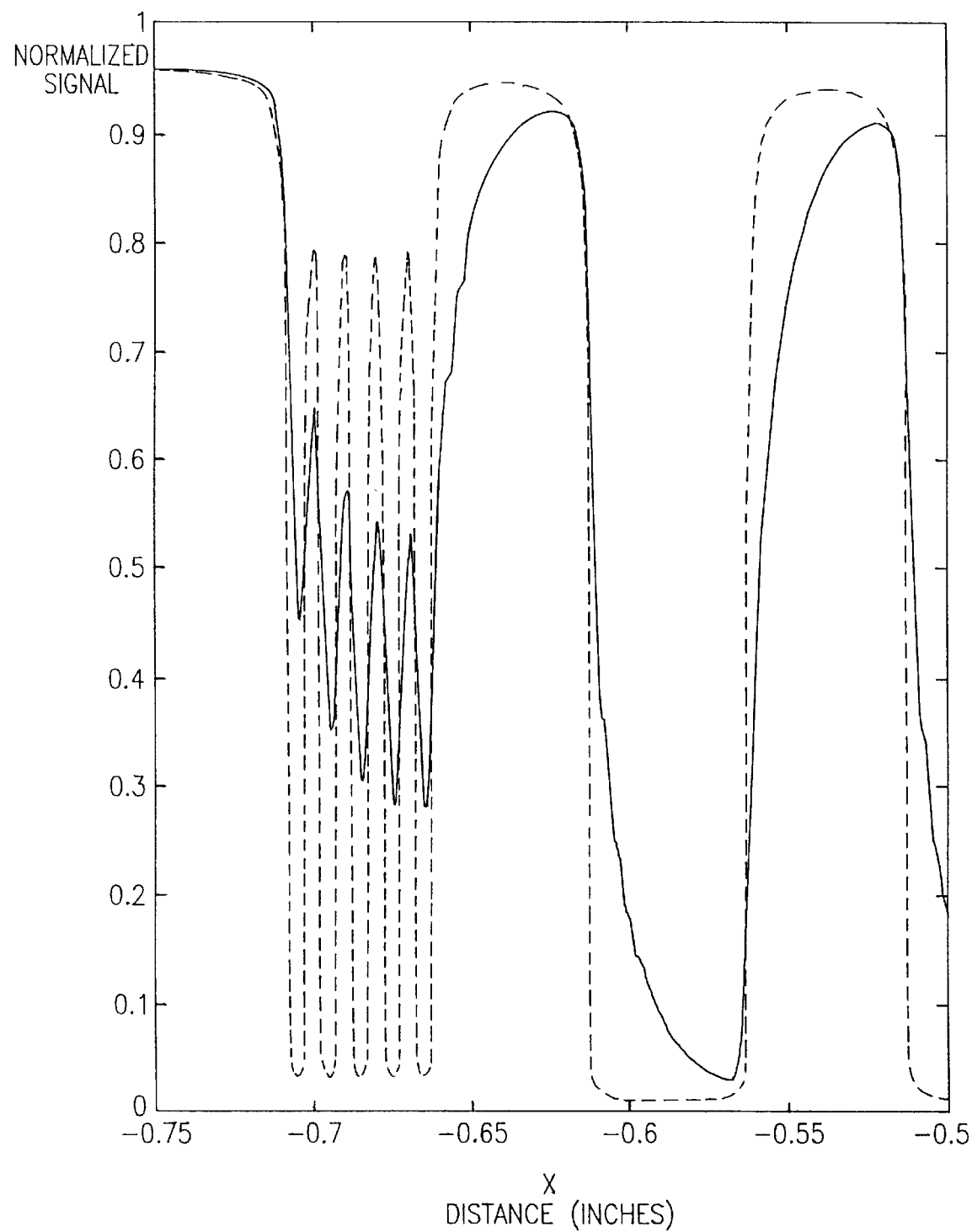
FIGS. 13 and 14 show how the intermediate and final image signals of FIGS. 11 and 12 are changed by the addition of an amplitude mask.
Figure 14:
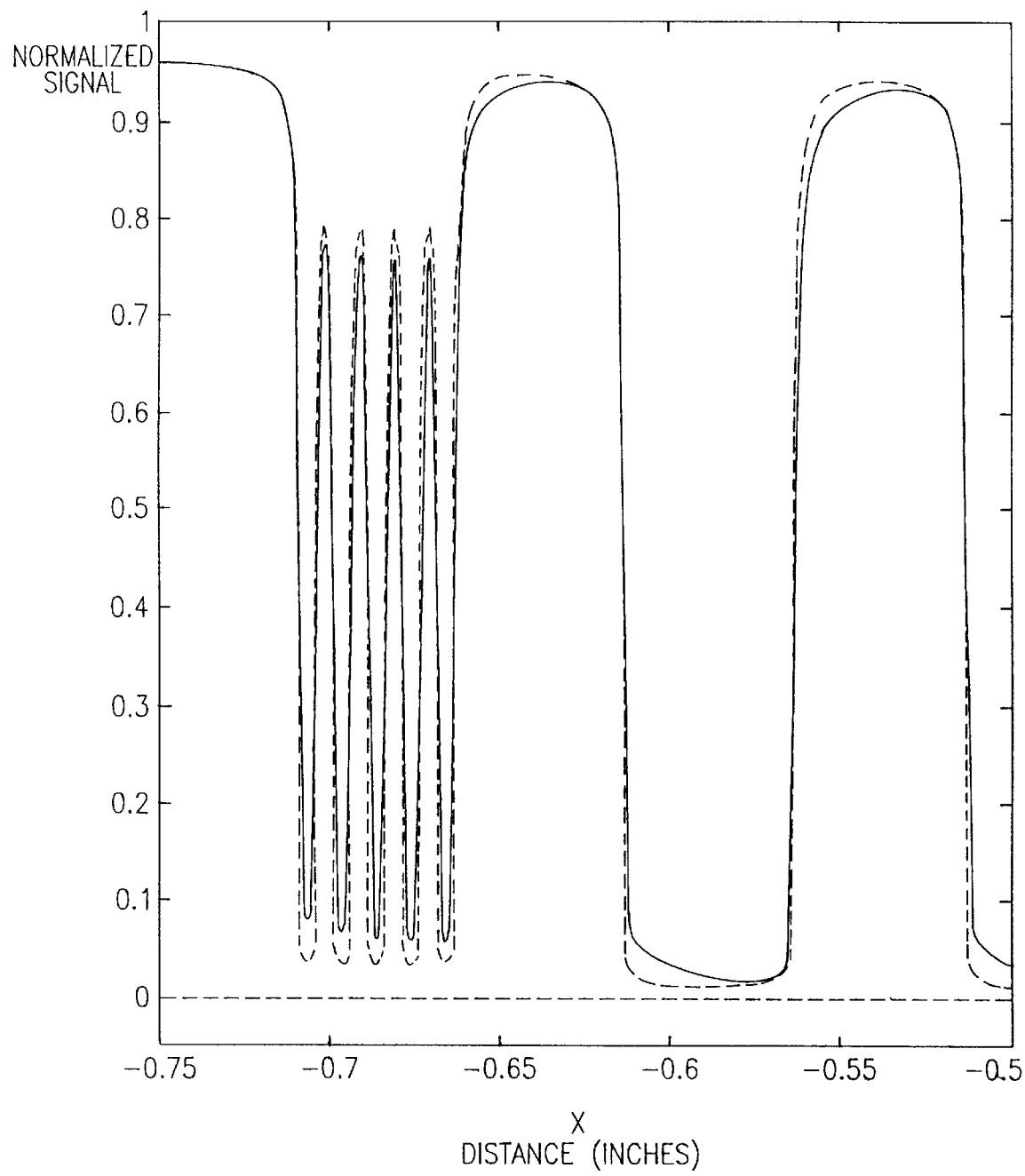

The magnitude of the improvement in image quality that is produced by the method and apparatus of the invention is illustrated in FIGS. 11–14, each of which shows in dotted lines the calculated reflectivity, as a function of distance X, for an exemplary object which takes the form of a bar code test pattern, together with the corresponding calculated normalized magnitude of the intermediate or final image signal, with and without the amplitude mask of the invention. FIG. 11, for example, shows the reflectivity of the bar code test pattern together with the intermediate image signal that is produced when an imaging system of the type shown in FIG. 6 uses the recovery function but not the amplitude mask of the invention. FIG. 12 shows the same test pattern together with the final signal recovered from the intermediate image signal of FIG. 11. Together, these Figures show that, even without an amplitude mask, the recovery function of the invention results in a final image signal which resembles the reflectivity of the test pattern from which it was derived. FIG. 13 shows the calculated intermediate image signal that is produced when an imaging system of the type shown in FIG. 6 uses both the recovery function and the amplitude mask of the invention, and FIG. 14 shows the calculated associated final image signal. Together, these Figures show that, when the recovery function and amplitude mask of the invention are used in conjunction with one another, they cooperate and complement one another to produce a final image which represents a substantial improvement over previously known imaging systems that use phase masks and phase mask-based approximations of recovery functions.

While the above-described embodiments make use of the discrete Fourier transform pair and transform quantities back and forth between the spatial and spatial frequency domains, the present invention may be practiced using other types of transform pairs, or other types of convolution or superposition integrals, together with the corresponding types of domains. The recovery function and recovery algorithm of the invention might, for example, be implemented using wavelet transform pairs and transformations back and forth between the spatial frequency and spatial domains. It will therefore be understood that the present invention is not limited to any particular type of transform pair, or equivalent convolution or superposition integral, and any particular types of transform domains.

While the invention has been described with reference to a number of specific embodiments, it will be understood that the true spirit and scope thereof should be determined only with reference to the following claims.

What is claimed is:

1. An imaging system for imaging an object located in a target region, said imaging system including, in combination:
   an optical assembly having an optical axis, said optical assembly including:
   a.) amplitude masking means for receiving light and transmitting light having an attenuated amplitude that varies as a function of position within said amplitude masking means, said function being substantially free of discontinuities;
   b.) imaging means for forming an intermediate image of said object, said image having imaging errors that include at least a misfocus error that is dependent upon the distance between the imaging means and the object; and
   c.) phase masking means for receiving light and modifying the phase thereof as a function of position within said phase masking means;
   image sensing means, including an array of photosensitive elements, for receiving said intermediate image and converting said image into an intermediate image signal that includes a plurality of elements which are distorted by said imaging errors; and
   processing means for:
   a.) providing a generalized recovery function that, in the frequency domain, includes at least the reciprocal of the calculated non-ideal Incoherent Optical Transfer Function (IOTF) of said optical assembly, under a condition of approximately optimum focus; and
   b.) applying said recovery function to one of a frequency domain and a spatial domain representation of said intermediate image signal to produce a final image signal that includes a set of elements which together define a representation of said object which is largely free of those of said imaging errors which have been taken into account in the calculation of said calculated non-ideal IOTF.

2. The imaging system of claim 1 in which said amplitude masking means is characterized by a transmittance function which approximates one of a Gaussian function, an exponential function, a Bessel function and segments of cosine functions.

3. The imaging system of claim 1 in which said amplitude masking means is formed as a coating on a surface of one of said imaging means and said phase masking means.

4. The imaging system of claim 1 in which at least two of said amplitude masking means, said imaging means and said phase masking means comprise different parts of a single element.

5. The imaging system of claim 1 further including means for supporting said amplitude masking means, said imaging means, and said phase masking means in a predetermined spatial relationship to one another.

6. The imaging system of claim 1 in which said processing means applies said generalized recovery function by multiplying a frequency domain representation of said intermediate image signal by a frequency domain representation of said generalized recovery function.

7. The imaging system of claim 1 in which said processing means applies said generalized recovery function by convolving a spatial domain representation of said generalized recovery function with a spatial domain representation of said intermediate image signal.

8. The imaging system of claim 1 in which said generalized recovery function further includes a finishing function for one of (i) optimizing the spectral profile of the frequency domain representation of said intermediate image signal, and (ii) limiting the bandwidth of the frequency domain representation of the intermediate image signal.

9. The imaging system of claim 1 in which said generalized recovery function is a fraction the denominator of which comprises said calculated non-ideal IOTF, and the numerator of which comprises a calculated ideal IOTF of said optical assembly, without said phase masking means, under a condition of approximately optimum focus.

10. The imaging system of claim 9 in which said calculated non-ideal IOTF is calculated by calculating the autocorrelation of the approximately in-focus generalized pupil function of said optical assembly with said phase masking means, and in which said calculated ideal IOTF is calculated by calculating the autocorrelation of the approximately in-focus generalized pupil function of said optical assembly without said phase masking means.

11. The imaging system of claim 9 in which said generalized recovery function further includes a finishing function, and in which said finishing function is a function that takes into account at least one of (i) the cosine-fourth effect, (ii) the effect of non-uniform illumination across said target region, (iii) aliasing effects and (iv) diffusion effects.

12. The imaging system of claim 9 in which said generalized recovery function further includes a finishing function for one of (i) optimizing the spectral profile of the frequency domain representation of said intermediate image signal, and (ii) limiting the bandwidth of the frequency domain representation of the intermediate image signal.

13. The imaging system of claim 1 in which said phase masking means is a cubic phase mask which is shaped so that it corrects approximately only for said misfocus error.

14. The imaging system of claim 1 in which said processing means further includes means for storing said generalized recovery function in a form which approximates the form in which it is applied to said intermediate image signal.

15. An imaging system for imaging an object located in a target region, said imaging system including, in combination:
an optical assembly having an optical axis, said optical assembly including:
a.) aperture means for defining an aperture having a transmittance which decreases continuously as the distance from said optical axis increases, said aperture means being characterized by an aperture function;
b.) lens means for forming an intermediate image of said object, said image having imaging errors that include at least a misfocus error that is dependent upon the distance between said lens means and said object, said lens means being characterized by a lens function; and
c.) phase masking means for receiving light incident thereon and modifying the phase thereof to cause the Optical Transfer Function (OTF) of the optical assembly to be approximately invariant over a range of distances between said lens means and said object, said phase masking means being characterized by a phase function;
image sensing means, including an array of photosensitive elements, for receiving said intermediate image and converting said image into an intermediate image signal that includes a plurality of image elements which are distorted by said imaging errors;
a memory for storing a set of said image elements; and
processing means for:
a.) obtaining a generalized recovery function that varies in accordance with at least the inverse of the non-ideal Incoherent Optical Transfer Function (IOTF) of said optical assembly, as calculated from at least said aperture function, said lens function and said phase function, under an approximately in-focus condition; and
b.) combining one of a frequency and spatial domain representation of said intermediate image signal and said generalized recovery function to produce a recovered image signal that includes a set of image elements that together define a representation of said object in which said imaging errors have been reduced.

16. The imaging system of claim 15 in which said aperture means includes at least one amplitude mask characterized by a transmittance function that approximates one of a Gaussian function, an exponential function, a Bessel function and segments of cosine functions.

17. The imaging system of claim 15 in which said aperture means includes an amplitude mask, and in which said amplitude mask comprises a coating on a surface of one of said phase masking means and said lens means.

18. The imaging system of claim 15 in which at least two of said aperture means, said lens means and said phase masking means comprise different parts of a single article.

19. The optical reading apparatus of claim 15 further including means for supporting said aperture means, said lens means, and said phase masking means in a predetermined spatial relationship to one another.

20. The imaging system of claim 15 in which said combining includes the multiplying of frequency domain representations of said generalized recovery function and said intermediate image signal, and the taking of an Inverse Fast Fourier Transform (IDFFT) of the result of said multiplying to produce said recovered image signal.

21. The imaging system of claim 15 in which said combining includes a convolution integration of a spatial domain representation of said generalized recovery function with a spatial domain representation of said intermediate image signal.

22. The imaging system of claim 21 in which said calculated non-ideal IOTF is calculated by calculating the autocorrelation of the approximately in-focus generalized pupil function of said optical assembly with said phase masking means, and in which said calculated ideal IOTF is calculated by calculating the autocorrelation of the approximately in-focus generalized pupil function of said optical assembly without said phase masking means.

23. The imaging system of claim 15 in which said calculated non-ideal IOTF of said optical assembly is calculated as the product of a plurality of terms including: said aperture function, said lens function, said phase function, and at least one additional term which mathematically describes an error producing effect not otherwise included in said aperture function, said lens function or said phase function.

24. The imaging system of claim 23 in which said error producing effect is spherical aberration in said lens means.

25. The imaging system of claim 15 in which said phase masking means is a cubic phase mask which is dimensioned so that it corrects approximately only for said misfocus error.

26. The imaging system of claim 15 in which said generalized recovery function is a fraction the denominator of which comprises said calculated non-ideal IOTF, and the numerator of which comprises a calculated ideal IOTF of said optical assembly, without said phase masking means, under an approximately in-focus condition.

27. The imaging system of claim 26 in which said numerator further includes a finishing function for one of (i) optimizing the spectral profile of the frequency domain representation of said intermediate image signal, and (ii) limiting the bandwidth of the frequency domain representation of said intermediate image signal.

28. The imaging system of claim 26 in which said numerator further includes a finishing friction that takes into account at least one of (i) the cosine-fourth effect, (ii) the effect of non-uniform illumination across said target region, (iii) aliasing effects, and (iv) diffusion effects.

29. The imaging system of claim 15 in which said generalized recovery function is calculated and stored prior to the imaging of said object.

30. An imaging system for imaging an object located in a target region, said imaging system including, in combination:
   an optical assembly having an optical axis, said optical assembly including:
      a.) an aperture defining element having a transmittance which decreases continuously as the distance from the center of said aperture defining element increases in at least one direction;
      b.) at least one image forming element for forming an image of said object, said image including imaging errors that include at least a misfocus error that is dependent upon the distance between said at least one image forming element and said object; and
      c.) at least one phase mask for receiving light incident thereon and modifying the phase thereof to cause the Optical Transfer Function (OTF) of the optical assembly to be approximately invariant over a predetermined depth of field;
   image sensing means, including an array of photosensitive elements, for receiving said image and converting said image into an intermediate image signal;
   digital signal processing means for:
      a.) obtaining a generalized recovery function having a frequency domain representation that includes the calculated ideal Incoherent OTF (IOTF) of said optical assembly, without said at least one phase mask, under an approximately in-focus condition, divided by the calculated non-ideal IOTF of said optical assembly, with said at least one phase mask, under an approximately in-focus condition; and
      b.) processing said intermediate image signal and said generalized recovery function to produce a final image signal which is a better representation of said object than the intermediate image signal that would be produced by said image sensing means in the absence of said at least one phase mask.

31. The imaging system of claim 30 in which said aperture defining element includes an amplitude mask characterized by a transmittance function that approximates one of a Gaussian function, an exponential function, a Bessel function, and segments of cosine functions.

32. The imaging system of claim 30 in which said aperture defining element is supported on one of said at least one image forming element and said at least one phase mask.

33. The imaging system of claim 30 in which said at aperture defining element, said at least one image forming element, and said at least one phase mask comprise different parts of a single structure.

34. The imaging system of claim 30 in which said at least one phase mask is a cubic phase mask having a shape which cause it to correct approximately only for said misfocus error.

35. The imaging system of claim 30 in which said digital signal processing means multiplies a frequency domain representations of said intermediate image signal and said generalized recovery function.

36. The imaging system of claim 30 in which said digital signal processing means convolves spatial domain representations of said generalized recovery function and said intermediate image signal.

37. The imaging system of claim 30 in which said calculated ideal IOTF is calculated by calculating the autocorrelation of an approximately in-focus generalized pupil function of said optical assembly without said at least one phase mask, and in which said calculated non-ideal IOTF is calculated by calculating the autocorrelation of an approximately in-focus generalized pupil function of said optical assembly with said at least one phase mask.

38. The imaging system of claim 30 in which said calculated non-ideal IOTF takes into account at least one aberration producing feature of said at least one image forming element.

39. The imaging system of claim 30 in which said generalized recovery function further includes a finishing function for one of (i) optimizing the spectral profile of said intermediate image signal, and (ii) limiting the bandwidth of said intermediate image signal.

40. The imaging system of claim 30 in which said generalized recovery function further includes a finishing function which reduces the magnitude of imaging errors that result from at least one of (i) the cosine-fourth effect, (ii) the effect of non-uniformities in the illumination of said target region, (iii) aliasing effects, and (iv) diffusion effects.

41. The imaging system of claim 30 in which said generalized recovery function is produced and stored prior to the time that said object is imaged by said imaging system.

42. The imaging system of claim 30 in which said digital signal processing means is adapted to calculate a transform and inverse transform of signals generated during the operation of said imaging system, and in which said transform and inverse transform include at least a Discrete Fast Fourier Transform and Inverse Discrete Fast Fourier Transform.

43. In an optical reading apparatus for reading optically encoded data from an indicia located in a target region, in combination:
   an optical assembly having an optical axis, said optical assembly including:
      a.) at least one amplitude mask for receiving and transmitting light and for modifying said light in accordance with a transmittance function characterized by a transmittance that decreases smoothly as the distance from the center of said at least one amplitude mask increases;
      b.) image forming means for forming an intermediate image of said indicia, said intermediate image including imaging errors that include at least a misfocus error that is dependent on the distance between said image forming means and said indicia; and
      c.) at least one phase mask for receiving light incident thereon and modifying the phase thereof as a function of distance from the center of said at least one phase mask;

an image sensor for receiving said intermediate image and converting said image into an intermediate image signal; and digital signal processing means for:
  a.) obtaining a generalized recovery function that varies in accordance with at least the reciprocal of the calculated non-ideal Incoherent Optical Transfer Function (IOTF) of said optical assembly, under a condition of approximately optimum focus; and
  b.) processing one of a frequency domain and a spatial domain representation of said generalized recovery function and said intermediate image signal to produce a final image signal having a reduced quantity of those imaging errors which have been taken into account in the calculation of said calculated non-ideal IOTF.

44. The optical reading apparatus of claim 43 further including decoding means for decoding said final image signal to produce said optically encoded data.

45. The optical reading apparatus of claim 43 further including means for supporting said at least one amplitude mask, said image forming means, and said at least one phase mask in a predetermined spatial relationship to one another.

46. The optical reading apparatus of claim 43 in which said transmittance function approximates one of a Gaussian function, an exponential function, a Bessel function, and segments of cosine functions.

47. The optical reading apparatus of claim 43 in which said generalized recovery function is a fraction the denominator of which comprises said calculated non-ideal IOTF of said optical assembly, and the numerator of which comprises the calculated ideal IOTF of said optical assembly, without said at least one phase mask, under a condition of approximately optimum focus.

48. The optical reading apparatus of claim 47 in which said calculated non-ideal IOTF is calculated by calculating the autocorrelation of the approximately in-focus generalized pupil function of said optical assembly with said at least one phase mask, and in which said calculated ideal IOTF is calculated by calculating the autocorrelation of the approximately in-focus generalized pupil function of said optical assembly without said at least one phase mask.

49. The optical reading apparatus of claim 43 in which said generalized recovery function further includes a finishing function which is adapted to optimize the performance of said reading apparatus for bar code reading applications.

50. The optical reading apparatus of claim 43 in which said generalized recovery function further includes a finishing function which is adapted to reduced imaging errors that result from at least one of (i) the cosine-fourth effect, (ii) the effect of non-uniformities in the illumination of said indicia, (iii) aliasing effects, and (iv) diffusion effects.

51. The optical reading apparatus of claim 43 in which said image sensor is a 1D image sensor, and in which said generalized recovery function is a generalized 1D recovery function.

52. An optical reading apparatus as set forth in claim 43 in which said image sensor is a 2D image sensor, and in which said generalized recovery function is a generalized 2D recovery friction.

53. The optical reading apparatus of claim 43 in which said digital signal processing means is adapted to calculate a transform and an inverse transform of signals generated during the operation of said reading apparatus, and in which said transform and inverse transform include at least a Discrete Fast Fourier Transform and an Inverse Discrete Fast Fourier Transform.

54. In an optical reading apparatus for reading optically encoded data from an indicia located in a target region, in combination:

an optical assembly having an optical axis, said optical assembly including:
  a.) aperture means for defining a soft aperture for said optical assembly, said aperture means being characterized by an aperture function;
  b.) lens means for forming an intermediate image of said indicia, said image having imaging errors that include at least a misfocus error that is dependent upon the distance between said lens means and said indicia, said lens means being characterized by a lens function; and
  c.) phase masking means for receiving light incident thereon and modifying the phase thereof to cause the Optical Transfer Function (OTF) of the optical assembly to remain approximately constant over a range of distances between said lens means and said indicia, said phase masking means being characterized by a phase function;

image converting means for receiving said intermediate image and converting said image into an intermediate image signal that includes a plurality of image elements which are distorted by said imaging errors;

memory means for storing a set of said image elements; and processing means for:
  a.) obtaining a generalized recovery flnction that varies in accordance with at least the inverse of the calculated actual Incoherent Optical Transfer Function (IOTF) of said optical assembly, including at least said aperture function, said lens function and said phase function, under an approximately in-focus condition; and
  b.) combining one of a frequency and a spatial domain representation of said recovery function and said set of image elements to produce a final image signal that includes image elements which have a reduced imaging error content.

55. The optical reading apparatus of claim 54 further including means for decoding said final image signal.

56. The optical reading apparatus of claim 54 in which said aperture function is characterized by a transmittance that decreases continuously as the distance from the center of said aperture means increases in at least one direction.

57. The optical reading apparatus of claim 54 in which said aperture function approximates one of a Gaussian function, an exponential function, a Bessel function, and segments of cosine functions.

58. The Optical reading apparatus of claim 54 in which said generalized recovery function is a fraction the denominator of which comprises said calculated actual IOTF of said optical assembly, and the numerator of which comprises the calculated ideal IOTF of said optical assembly, without said phase masking means, under an approximately in-focus condition.

59. The optical reading apparatus of claim 58 in which said calculated actual IOTF is calculated by calculating the autocorrelation of the approximately in-focus generalized pupil function of said optical assembly, with said phase masking means, and in which said calculated ideal IOTF of said optical assembly is calculated by calculating the autocorrelation of the approximately in-focus generalized pupil function of said optical assembly, without said phase masking means.

60. The optical reading apparatus of claim 54 in which said phase masking means is a cubic phase mask which is shaped so that it corrects approximately only for said misfocus error.

61. The optical reading apparatus of claim 54 in which said recovery function further includes a finishing function for minimizing the imaging error content of said final image signal when said reading apparatus is used to read bar code symbols.

62. The optical reading apparatus of claim 54 in which said generalized recovery function further includes a finishing flnction which takes into account at least one of (i) the cosine-fourth effect, (ii) the effect of non-uniform illumination across said target region, (iii) aliasing effects and (iv) diffusion effects.

63. The optical reading apparatus of claim 54 in which said image converting means is a 1D image sensor, and in which said generalized recovery function is a generalized 1D recovery function.

64. The optical reading apparatus of claim 54 in which said image converting means is a 2D image sensor, and in which said generalized recovery function is a generalized 2D recovery function.

* * * * *

UNITED STATES PATENT AND TRADEMARK OFFICE
CERTIFICATE OF CORRECTION

PATENT NO. : 6,097,856
DATED : August 1, 2000
INVENTOR(S) : Charles Mitchell Hammond, Jr.

It is certified that error appears in the above—identified patent and that said Letters Patent is hereby corrected as shown below:

Claim 28, Column 19, Line 14, after the word finishing please delete "friction" and replace with the word --function--.

Claim 54, Column 22, Line 28, after the word recovery please delete "flnction" and replace with the word --function--.

Claim 62, Column 23, Line 10, please delete the word "flnction" and replace with the word --function--.

Signed and Sealed this

Twenty-fourth Day of April, 2001

*Attest:*

NICHOLAS P. GODICI

*Attesting Officer*         Acting Director of the United States Patent and Trademark Office